United States Patent
Djukic et al.

(10) Patent No.: US 12,289,343 B2
(45) Date of Patent: Apr. 29, 2025

(54) DETECTING MALICIOUS THREATS IN A 5G NETWORK SLICE

(71) Applicant: Ciena Corporation, Hanover, MD (US)

(72) Inventors: Petar Djukic, Ottawa (CA); David Jordan Krauss, Centreville, VA (US); James P'ford't Carnes, III, Baltimore, MD (US); William Kaufmann, Chicago, IL (US); Balaji Subramaniam, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 327 days.

(21) Appl. No.: 17/838,735

(22) Filed: Jun. 13, 2022

(65) Prior Publication Data

US 2022/0330027 A1 Oct. 13, 2022

Related U.S. Application Data

(63) Continuation-in-part of application No. 17/571,342, filed on Jan. 7, 2022, now Pat. No. 12,132,748.

(60) Provisional application No. 63/150,694, filed on Feb. 18, 2021.

(51) Int. Cl.
*H04L 9/40* (2022.01)
*G06F 21/62* (2013.01)
*H04L 45/302* (2022.01)
*H04L 47/2475* (2022.01)
*H04W 12/128* (2021.01)

(52) U.S. Cl.
CPC .......... *H04L 63/20* (2013.01); *G06F 21/6254* (2013.01); *H04L 45/306* (2013.01); *H04L 47/2475* (2013.01); *H04L 63/1416* (2013.01); *H04W 12/128* (2021.01)

(58) Field of Classification Search
CPC . H04L 63/20; H04L 63/1416; H04L 63/1408; H04L 63/1433; H04L 63/02; H04L 63/0236; H04L 63/1441; H04L 63/0263; H04L 9/3247; H04L 9/321; H04L 9/3268; H04L 63/168; H04L 45/306; H04L 41/22; H04L 45/64; H04L 63/08; H04L 67/10; H04L 12/66; G06N 20/00; H04W 12/122; G06F 21/6254; G06F 21/566; G06F 21/552; G06F 21/602; G06F 21/606; G06F 21/51; G06F 21/57; G06F 21/50; G06F 21/55; G06F 21/45
See application file for complete search history.

(56) References Cited

U.S. PATENT DOCUMENTS

| | | |
|---|---|---|
| 8,589,503 B2 | 11/2013 | Alperovitch et al. |
| 8,606,910 B2 | 12/2013 | Alperovitch et al. |
| 9,060,292 B2 | 6/2015 | Callard et al. |

(Continued)

*Primary Examiner* — Kyung H Shin
(74) *Attorney, Agent, or Firm* — Clements Bernard Walker; Christopher L. Bernard

(57) ABSTRACT

Systems and methods for monitoring a network slice are provided. A method, according to one implementation, include extracting information from network traffic received from one or more User Plane Function (UPF) components of a network slice; examining the extracted information using Machine Learning (ML), and, in response to detecting of one or more malicious threats based on the examined extracted information by the ML, causing one or more actions to isolate the network traffic to protect at least the network slice from the one or more malicious threats.

20 Claims, 16 Drawing Sheets

(56) References Cited

U.S. PATENT DOCUMENTS

| | | |
|---|---|---|
| 9,152,808 B1 | 10/2015 | Ramalingam et al. |
| 9,397,917 B2 | 7/2016 | Li et al. |
| 9,432,257 B2 | 8/2016 | Li et al. |
| 9,503,443 B2 | 11/2016 | Krauss et al. |
| 9,602,536 B1 | 3/2017 | Brown, Jr. et al. |
| 9,819,565 B2 | 11/2017 | Djukic et al. |
| 9,825,982 B1 | 11/2017 | Htay |
| 9,838,271 B2 | 12/2017 | Djukic et al. |
| 9,838,272 B2 | 12/2017 | Djukic et al. |
| 10,038,700 B1 | 7/2018 | Duchin et al. |
| 10,148,578 B2 | 12/2018 | Morris et al. |
| 10,862,749 B1 | 12/2020 | Kiyak et al. |
| 11,049,039 B2 | 6/2021 | Zimmer et al. |
| 11,102,238 B2 | 8/2021 | Ackerman et al. |
| 11,165,797 B2 | 11/2021 | Ackerman et al. |
| 2002/0059078 A1 | 5/2002 | Valdes et al. |
| 2004/0172557 A1 | 9/2004 | Nakae et al. |
| 2004/0213229 A1 | 10/2004 | Chang et al. |
| 2006/0101515 A1 | 5/2006 | Amoroso et al. |
| 2006/0259967 A1 | 11/2006 | Thomas et al. |
| 2007/0258437 A1 | 11/2007 | Bennett |
| 2007/0261112 A1 | 11/2007 | Todd et al. |
| 2012/0254951 A1 | 10/2012 | Munetoh et al. |
| 2013/0298192 A1 | 11/2013 | Kumar et al. |
| 2013/0305369 A1 | 11/2013 | Karta et al. |
| 2014/0096229 A1 | 4/2014 | Burns et al. |
| 2014/0244834 A1 | 8/2014 | Guedalia et al. |
| 2014/0328256 A1 | 11/2014 | Djukic et al. |
| 2015/0373043 A1* | 12/2015 | Wang .................... G06F 21/6254 706/12 |
| 2016/0006753 A1 | 1/2016 | McDaid et al. |
| 2016/0300227 A1 | 10/2016 | Subhedar et al. |
| 2017/0019315 A1 | 1/2017 | Tapia et al. |
| 2017/0034193 A1 | 2/2017 | Schulman et al. |
| 2017/0134405 A1 | 5/2017 | Ahmadzadeh et al. |
| 2017/0230267 A1 | 8/2017 | Armolavicius et al. |
| 2017/0353490 A1 | 12/2017 | Krauss et al. |
| 2017/0374090 A1 | 12/2017 | McGrew et al. |
| 2018/0139129 A1* | 5/2018 | Dowlatkhah ......... H04L 45/306 |
| 2018/0191743 A1 | 7/2018 | Reddy et al. |
| 2018/0212928 A1 | 7/2018 | Gerber et al. |
| 2018/0225357 A1 | 8/2018 | Greco et al. |
| 2018/0285767 A1 | 10/2018 | Chew |
| 2019/0081983 A1* | 3/2019 | Teal .................... H04L 47/2475 |
| 2019/0141056 A1 | 5/2019 | Estabrooks et al. |
| 2019/0362072 A1 | 11/2019 | Kesarwani et al. |
| 2020/0019821 A1 | 1/2020 | Baracaldo-Angel et al. |
| 2022/0007194 A1* | 1/2022 | Shaw .................... H04L 63/20 |

* cited by examiner

| IDS | PROBLEM STATEMENT | DATASETS | PREPROCESS | MACHINE LEARNING ALGORITHM |
|---|---|---|---|---|
| NIDS | Detect network intrusions using network flows | NSL-KDD, UNSW-NB15, AWID, CIC-IDS2017, Botnet2014 (pkts) | Flow-based features (tabular format) extracted from PCAP files | DT, RF SVM, MLP, XGBoost |
| HIDS | Detect network intrusions using system logs | ADFA-LD, ADFA-WD, UNM, Firefox-DS (system logs) | NLP techniques (n-gram, bag-of-words, sliding window) | KNN, SVM, HMM, LSTM, CNN, MLP, Rule Learning |
| CIDS | Detect network intrusions using network flows and system logs | CIC-IDS2018, NGIDS-DS (not available) | Only network information is utilized as NIDS. No similar research in literature. | |

FIG. 6

| Dataset | CIDS Model without HF | XGBoost without HF | CIDS with HF | Samples |
|---|---|---|---|---|
| Benign | 0.940 | 0.999 | 0.999 | 84,292 |
| Bot | 0.997 | 0.999 | 0.999 | 14,875 |
| DDOS-HOIC | 0.994 | 1.000 | 1.000 | 33,490 |
| DDOS-LOIC-HTTP | 0.097 | 0.999 | 1.000 | 9,618 |
| DDOS-LOIC-UDP | 0.742 | 0.770 | 0.976 | 182 |
| DoS-GoldenEye | 0.967 | 0.994 | 0.986 | 555 |
| DoS-Hulk | 0.997 | 1.000 | 0.999 | 3,222 |
| DoS-SlowHTTPTest | 0.503 | 0.544 | 0.995 | 2,607 |
| DoS-Slowloris | 0.757 | 0.983 | 0.991 | 326 |
| FTP-BruteForce | 0.716 | 0.878 | 0.999 | 7,896 |
| SSH-BruteForce | 0.979 | 1.000 | 1.000 | 2,831 |
| Average | 0.790 | 0.924 | 0.995 | Total 159,894 |

230

| Dataset | DNN without HF | XGBoost without HF | DNN with HF | XGBoost with HF | Samples |
|---|---|---|---|---|---|
| Benign | 0.991 | 0.999 | 0.998 | 1.000 | 84,292 |
| Bot | 0.998 | 0.999 | 0.990 | 1.000 | 14,875 |
| DDOS-HOIC | 0.988 | 1.000 | 1.000 | 0.999 | 33,490 |
| DDOS-LOIC-HTTP | 1.000 | 0.999 | 0.999 | 1.000 | 9,618 |
| DDOS-LOIC-UDP | 0.733 | 0.770 | 0.987 | 0.997 | 182 |
| DoS-GoldenEye | 0.989 | 0.994 | 0.955 | 0.998 | 555 |
| DoS-Hulk | 0.996 | 1.000 | 0.999 | 1.000 | 3,222 |
| DoS-SlowHTTPTest | 0.206 | 0.544 | 0.998 | 1.000 | 2,607 |
| DoS-Slowloris | 0.958 | 0.983 | 0.915 | 0.998 | 326 |
| FTP-BruteForce | 0.806 | 0.878 | 0.999 | 0.999 | 7,896 |
| SSH-BruteForce | 0.998 | 1.000 | 1.000 | 1.000 | 2,831 |
| Average | 0.878 | 0.924 | 0.985 | 0.999 | 0.790 |

FIG. 17

DETECTING MALICIOUS THREATS IN A 5G NETWORK SLICE

CROSS-REFERENCE TO RELATED APPLICATIONS

The present application is a Continuation-in-Part (CIP) of U.S. patent application Ser. No. 17/571,342, filed Jan. 7, 2022, entitled "Machine learning detection of network attacks using traffic and log information," the contents of which are incorporated by reference herein, which claims the benefit of priority to U.S. Provisional Patent App. No. 63/150,694, filed Feb. 18, 2021, entitled "Network intrusion detection with multiple machine learning techniques," the contents of which are incorporated by reference herein.

TECHNICAL FIELD

The present disclosure generally relates to networking. More particularly, the present disclosure relates to systems and methods for detecting malicious network attacks in 5G network slices.

BACKGROUND

There are many known solutions using machine learning algorithms to detect network intrusions or network attacks. For example, Zhiyan Chen et al., "Machine Learning Algorithms for the Detection of Attacks on IoT Systems: Survey, Open Issues and Challenges," the contents of which are incorporated by reference herein, is a survey of over 200 existing machine learning references for detecting network intrusions and attacks. However, none of these approaches solve the problem of detecting each stage of an ongoing multi-prong network attack nor do they determine what type of sub-attack is currently taking place. Therefore, there is a need for detecting any of multiple network sub-attacks of a long-term attack and for detecting what type of sub-attack may be occurring.

None of the conventional solutions are able to fulfill the specific problem at hand regarding the act of detecting multiple types of sub-attacks. One reason seems to be that many machine learning approaches require a dataset to verify that a machine learning approach actually works. It appears that approaches to date are based on a very narrow set of datasets that have been used to train and test machine learning algorithms. Known solutions (e.g., described in Chen et al.) focus on detecting a single sub-attack by selecting a machine learning algorithm and tuning it on a dataset. It was also discovered with experimentation that, typically, one must search a space of algorithms to detect a sub-attack and then tune a specific algorithm. Based on this experimentation, using the known algorithms in scikit-learn, it was determined that no one algorithm could be used to detect multiple sub-attacks. It was also discovered that no single conventional algorithm was able to detect all sub-attacks equally well. Therefore, there is another need in network intrusion detection to potentially use a combination of algorithms, as well as certain data sources, to solve the problem of detecting multiple sub-attacks simultaneously.

It may be noted that, until recently, the "edge" of a network had not been fully defined. However, the Core Network (CN) of the third-generation Partnership Program (3GPP) standards and fifth-generation (5G) standards has now been defined with greater clarity, whereby the edge may now be understood to terminate at a User Plane Function (UPF) component. The Internet may be connected to end-user devices or edge devices through N6 interfaces. In some embodiments, the virtualized UPF component may reside on a suitable intermediate device. However, it is believed that applying certain techniques for detecting attacks may not necessarily be applicable to a 3GPP (5G) network slice and therefore is not an obvious endeavor. Therefore, there is also a need to provide additional implementations for use in 3GPP (5G) network slices, especially since UPF components are typically not hosted on these intermediate components between the edge devices and a cloud network.

BRIEF SUMMARY

The present disclosure is directed to systems and methods for detecting intrusions, attacks, and sub-attacks launched against a communications network being observed. A process, according to one implementation, includes the step of obtaining network traffic information regarding data traffic in a network under observation and also obtaining system log information regarding operations of the network under observation. The process also includes the step of inserting the network traffic information and system log information into multiple analysis procedures, where each analysis procedure may be configured to detect a respective sub-attack of a multi-stage attack to which the network under observation is susceptible. The process further includes the step of combining the outputs of the multiple analysis procedures and determining if one or more sub-attacks have been launched against the network under observation. In response to determining that one or more sub-attacks have been launched, the process is configured to determine the types of the one or more sub-attacks.

In some embodiments, each of the multiple analysis procedures may use a machine learning model. For example, the machine learning models may include a Deep Neural Network (DNN) technique, an ensemble technique, a nearest neighbor technique, a clustering technique, and/or other techniques. The process may further include using a word-embedding procedure when one or more of the network traffic information and system log information is in textual form. For instance, the word-embedding procedure may be configured to change a textual representation of the information into a numerical representation used by the machine learning model. The machine learning model, according to some embodiments, may be configured to predict a sub-attack based on F1 scores.

Also, one or more sub-attacks may include, for example, reconnaissance, initial attack, pivoting, lateral movement, and data exfiltration. Alternatively, the one or more sub-attacks may include reconnaissance, resource development, initial access, execution, persistence, privilege escalation, defense evasion, credential access, discovery, lateral movement, collection, command and control, exfiltration, and impact. The system log information may include server logs, router logs, network element logs, equipment logs, device logs, event logs, transaction logs, and/or message logs.

The obtained network traffic information and system log information may be obtained in a "relatively short" time period, such as a time period having a width that is below a predetermined threshold (e.g., less than a few minutes, less than a few hours, less than a few days, etc.). The network traffic information may be detected using NetFlow, sFlow, IPFIX, and/or PCAP. In some embodiments, the network traffic information and system log information may be received from an edge element (or end-point device) at an edge of the network under observation. The process, according to some embodiments, may be performed by any type of Intrusion Detection System (IDS), such as, for example, a Combined IDS (CIDS) that include features of both a Network IDS (NIDS) and a Host-based IDS (HIDS).

Furthermore, the embodiments of the present disclosure also include systems and methods for monitoring traffic in a third-generation Partnership Program (3GPP) or fifth-generation (5G) network slice or the like. In one implementation, a process may include extracting information from network traffic received from one or more User Plane Function (UPF) components of the 3GPP network slice. The process may also include examining the extracted information using Machine Learning (ML). Then, the process may further include determining if the extracted information includes one or more malicious threats. In response to detecting that the extracted information includes one or more malicious threats, the process may include the step of isolating the network traffic, i.e., the particular network traffic determined to include malicious threat to protect at least the network slice from the one or more malicious threats.

According to some embodiments, the step of isolating the network traffic may include the step of diverting network traffic to an isolated location in the network slice for further examination. The network slice, for example, may include one or more Session Management Function (SMF) components and one or more Policy Management Function (PMF) components. In some embodiments, the process may include causing the one or more SMF components and one or more PMF components to instruct the one or more UPF components to divert the network traffic to the isolated location when one or more malicious threats are detected. The step of isolating the network traffic may further include the step of preventing the spread of the one or more malicious threats throughout the network slice.

The ML mentioned here may include Deep Packet Inspection (DPI), which may be performed by a DPI module. The step of extracting the network traffic information may include the step of extracting one or more of 5-tuple Internet Protocol (IP) information and packet capture (PCAP) information. The process may further include the steps of: a) developing a ML model based on a dataset of Performance Metrics (PMs) of observed network traffic information to establish a baseline of expected usage profiles, b) applying the ML model to ongoing network traffic information to identify unexpected network usage that differs from the baseline of the expected usage profiles, and c) utilizing the identified unexpected network usage for detecting the one or more malicious threats.

In some embodiments, the one or more UPF components may be arranged in a data plane of the network slice. Also, the network slice may further include one or more Access and mobility Management Function (AMF) components and one or more Session Management Function (SMF) components arranged in a control plane of the 3GPP network slice. The one or more UPF components may be arranged between one or more end-user devices and the Internet. The end user devices access the Internet via one or more devices. At least one of the one or more devices in some cases may include a non-3GPP access device operating under one or more of Wi-Fi, Ethernet, Digital Subscriber Line (DSL), and Passive Optical Network (PON) protocols. At least one of the one or more devices in some cases may include a 3GPP access device. Each of the one or more 3GPP access devices is one of a gNodeB (gNB) device, and a Radio Unit (RU) and may include at least a Centralized Unit (CU) and a Distributed Unit (DU). The end user devices may be configured for communicating with the Internet via at least one of the one or more UPF components.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 6 is a table illustrating aspects of systems that utilize the NIDS, HIDS, and CIDS, according to some embodiments.

FIG. 17 is another table showing the results of CIDS of FIG. 7 compared with other models using different datasets, according to some embodiments.

DETAILED DESCRIPTION

Figure 1:
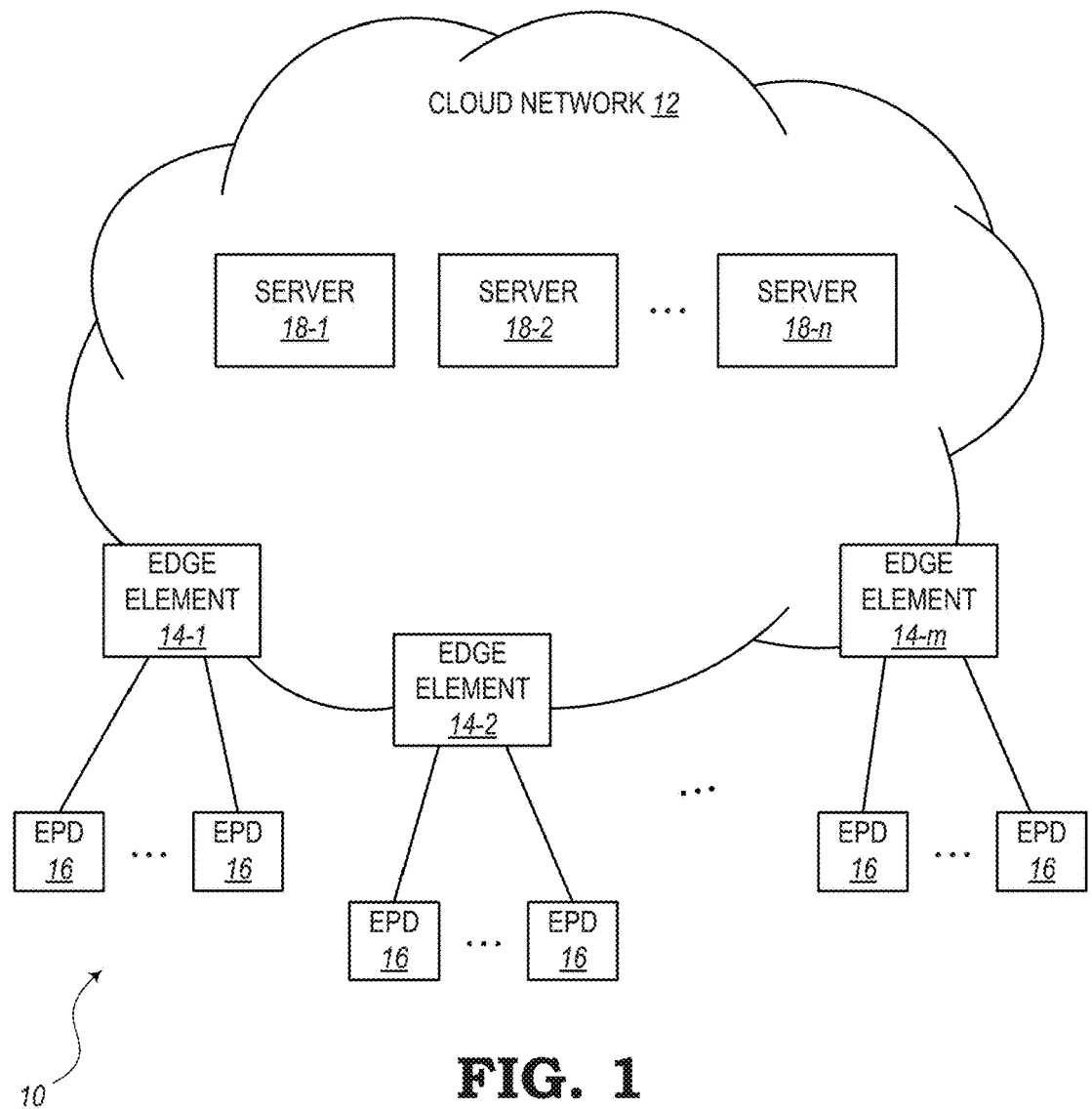
FIG. 1 is a block diagram illustrating a communications system that may be subjected to an attack by a malicious entity.

The present disclosure relates to systems and methods for network intrusion detection. The embodiments of the present disclosure are configured to use multiple machine learning techniques (or algorithms). Also, instead of using just network traffic information or just system log information, as is typically done in conventional systems, the systems and methods of the present disclosure are configured to utilize both network traffic information and system log information in a combined manner within the various machine learning techniques. Also, combinations of machine learning strategies can be used to detect specific sub-attacks at each of a number of various stages where an attacker may normally launch an attack.

The systems and methods of the present disclosure are configured to use a more relevant dataset that includes both log files and network data. Again, the conventional techniques do not use such a dataset in any of the known examples. Instead, the conventional systems might use just log files or might use just network data separately. It has been discovered in experimentations that the systems and methods of the present disclosure, using both network traffic flow data and system log data, can operate in a different manner (e.g., using supervised or unsupervised learning) with the combination of diverse sources of data to detect network anomalies more accurately and to classify specific attacks more accurately. Also, any of the various known machine learning algorithms can be used, such as those available in scikit-learn (e.g., Random Forest, Deep Neural Network (DNN), and other algorithms).

The following papers, which are incorporated by reference in the present disclosure, have been authored by some of the inventors of the present disclosure, including contributions as part of a project referred to as the "Evolution of Networked Services through a Corridor in Quebec and Ontario for Research and Innovation" (ENCQOR) project:

1) Jinxin Liu et al., "Machine Learning-Based Intrusion Detection: From Networks to Hosts,"
2) Zhiyan Chen et al., "Host-Based Network Intrusion Detection Under Feature Flattening and Cascade Machine Learning Approach,"
3) Yu Shen et al., "Prior Knowledge Input-Based Intrusion Detection on Network Flows and Hosts,"
4) Zhiyan Chen et al., "New Ensemble Methods for Accurate and Low-Cost Detection of Intrusive Traffic in IoT Networks,"
5) Carnes, III et al., U.S. Pat. Pub. No. 2020/0067935, "Network architecture providing device identification and redirection using whitelisting traffic classification," published Feb. 27, 2020,
6) Zhiyan Chen et al., "Machine Learning Algorithms for the Detection of Attacks on IoT Systems: Survey, Open Issues and Challenges," and
7) Zhiyan Chen et al., "All Predict Wisest Decides: A new Ensemble Learning Method for the Detection of APT Attacks in Internet of Things Networks."

The present disclosure is configured, among other things, to consider ways to add "network security" to networking products. Since networking equipment provisioning companies are able to provide products that can observe network traffic (e.g., including at least Layers 0, 1, and 2), this information gathered can then be used for their customers, especially in times when malicious attackers are trying to steal digital information, get into the network to damage infrastructure, etc. The systems and methods of the present disclosure are configured to use these observed network traffic measurements along with system log files (e.g., server logs, router logs, network device logs, etc.) as input. This combination of information can be used in a trained machine learning model to (1) determine a time period during which the network is under an attack and (2) classify the type of attack that is taking place during this time period. Also, the present disclosure is configured to discover each of a number of sub-attacks that may be launched against the network, even over a long time period, to discover multi-pronged attacks.

The present disclosure is related in some ways to the previous papers and further provides more details on how machine learning can be used to classify traffic into different attack types as a part of a security system and how system logs can help to improve the classification performance. The present disclosure focuses on detecting one or more sub-attacks and identifying the types of sub-attacks. From this point, any number of suitable responses may be conducted to remediate any problems that may arise as a result of the attack attempts.

In particular, the present disclosure addresses the concepts of detecting network intrusions, detecting theft of digital information, etc. In some cases, the types of attacks can be broken down into the following separate sub-attacks: reconnaissance, initial attack, pivoting, lateral movement, and data exfiltration. Each sub-attack may be a separate stage of a longer attack, which may usually start with an attacker getting into the network (e.g., reconnaissance, initial attack, etc.) and may progress to the final malicious goal of getting data out of the network (e.g., data exfiltration).

It may be noted that other types of sub-attacks are also possible (e.g., those described in attack.mitre.org/matrices/enterprise/). At any given point in time, an attacker could execute one of the stages of an attack. Thus, a single solution that can detect one sub-attack stage, independent of other sub-attacks, would be preferred from an engineering point of view.

The present disclosure may include two techniques (algorithms) for the detection of network intrusions. The first technique may be configured to use network traffic (flow) data and combines multiple machine learning strategies (algorithms) to arrive at a decision on what kind of attack the network is under. The present disclosure is not particularly an ensemble learning method as is known in some conventional systems, but rather the present disclosure provides algorithmically combined outputs of multiple machine learning strategies (algorithms), some of which may include ensemble learning algorithms (e.g., Random Forest ensemble learning algorithms). The present disclosure also provides systems and methods configured to incorporate various sources of data, which may include unstructured data (e.g., messages) to enhance the overall detection performance.

The second technique for detection of network intrusion described in the present disclosure may be referred to as a Deep Neural Network (DNN) solution, which is able to process both network traffic data and system log data. The DNN solution may be particularly well suited to take system log data as an input since it can use a word-embedding mechanism to change a textual representation of the data into a numerical representation that would be needed for machine learning purposes.

The present disclosure describes examples and implementations of both of these techniques for detection of network intrusion. It may be noted that the novelty of the embodiments of the present disclosure does not lie solely in the use of machine learning strategies. Instead, the points of novelty are explained in the present disclosure for utilizing distinct types of machine learning techniques for different sub-attacks that may be part of a larger malicious attack plot against the network. Also, by using not only network traffic information, the embodiments of the present disclosure are also configured to use system log information as well. The combination of using distinct types of information and using outputs of different machine learning techniques are believed to be unique in the field of network attack detection.

During research and experimentation, it was determined that no single algorithm (even ensemble learning) was able to detect all sub-attacks equally well. Therefore, it was found that a combination of algorithms would be needed to solve the problem of detecting multiple sub-attacks simultaneously.

Network elements (e.g., switches, routers, packet-optical transport, etc.) have the advantage of supporting traffic at Layer 0 (e.g., photonic, Dense Wavelength Division Multiplexing, etc.), Layer 1 (e.g., Time Division Multiplexing (TDM), etc.), Layer 2 (e.g., packet), etc. Thus, since the network equipment exists at the last few layers of the network stack, the networking equipment has the advantage of seeing all of the network traffic. It is possible for these network elements to provide insight about this traffic to network operators. Also, this information may include specific times when malicious attackers are trying to get into the network and damage infrastructure or steal digital information.

The systems and methods of the present disclosure may be configured for detection of network attacks and sub-attacks of a bigger, more extensive attack on a communications network. In some embodiments, the systems and methods may use machine learning to train a machine learning model. Then, the trained machine learning model can be used for processing newly obtained data (e.g., network traffic information and system log information) to determine a time period when a sub-attack is attempted by a malicious entity and to determine the type of sub-attack that the malicious entity is attempting. The machine learning model may utilize the outputs of multiple machine learning strategies, each of which may be able to specialize in one type of sub-attack. Also, the present disclosure may be considered as a "firewall-less" security system for providing automated detection at the edge of a network.

Detecting Network Sub-Attacks Using Traffic and Log Information

FIG. 1 is a block diagram illustrating a communications system 10 that may be subjected to an attack by a malicious entity. In this example, the communications system 10 includes a cloud network 12 (e.g., cloud, network, communications network, etc.) having a plurality of edge elements 14-1, 14-2, . . . , 14-m arranged at the edge of the cloud network 12. Also, the communications system 10 includes a plurality of end-point devices 16. For example, each of the end-points devices 16 may be an Internet of Things (IoT) device, a things-of-the-Internet device, a sensor, a camera, a user device, a networked server not working as a forwarding device (e.g., part of an IoT system), and/or other type of device. Each of the end-point device 16 may be configured to access the cloud network 12 via one or more of the edge elements 14-1, 14-2, . . . , 14-m. However, it should be known that often these end-point devices 16 can be hacked by a malicious entity to gain access to the communications system 10 and cause havoc. Furthermore, the communications system 10 may include a plurality of servers 18-1, 18-2, . . . , 18-n, which may be arranged within the cloud network 12 (i.e., not at the edge thereof). The servers may be grouped in data centers, for example edge data center or centralized data center (cloud). The servers may also be a part of a private, public cloud, or hybrid cloud. The servers may be connected through networking technology and may send packets between each other through core or edge routers. Network information described herein may also be collected from those routers.

In the embodiment of FIG. 1, one or more of the servers 18-1, 18-2, . . . , 18-n (and/or one or more of the edge elements 14-1, 14-2, . . . , 14-m) may be configured to detect network attacks according to the various implementations described in the present disclosure. At least one of the edge elements 14-1, 14-2, . . . , 14-m is configured to collect and classify network traffic and network services. In some embodiments, this information can be used to train classifiers. The traffic, according to some implementations, may come from one or more of the end-point devices 16, which might be overtaken by an attacker. Again, it may be assumed that attacks might start at the edge of the cloud network 12 and an attacker might work to get further into the servers 18-1, 18-2, . . . , 18-n.

Network traffic (or data traffic) may include any data moving within the communications system 10 at any time. The network traffic may be broken down into data packets that are transmitted over the communications system 10 using any suitable route. Network traffic may include "north-south" traffic (i.e., client-server traffic) and/or east-west traffic (i.e., server-server traffic, traffic within a data center, etc.). It may be important in some embodiments to monitor and analyze network traffic, such as, for example, to determine if any security or operational issues exist and thereby respond to these issues to reduce the possibility of an attack.

The communications system 10 may include the following steps for detecting network attacks:

1) One or more edge elements 14-1, 14-2, . . . , 14-m collect information about the network traffic and corresponding servers 18 in the cloud network 12. This information may include packet counts, flow counts (e.g., Internet Protocol Flow Information Export (IP-FIX), etc.) or information from deep packet inspection. The information with respect to the corresponding servers 18 may include system logs. The same network information may also be collected by routers connecting the servers in the cloud.
2) The collected network traffic information is sent a centralized point (e.g., a specific server 18 or network service configured with the attack detection capabilities of the present disclosure), which is configured to analyze and/or train classifiers.
3) The centralized server 18 disseminates the trained classifiers to the edge element 14-1, 14-2, . . . , 14-m.
4) One of the edge elements 14 uses the trained classifier to classify network traffic into one of the multiple sub-attack categories of interest.
5) If it is determined that the network traffic includes one of the sub-attack categories, a predefined policy instructs the corresponding edge element 14 what to do (e.g., re-route traffic, etc.).

Training and using a classifier to detect a network intrusion (or sub-attack of a multi-stage attack) is described. One or more of the servers 18 configured to detect network intrusion may be configured to train K classifiers on the same dataset, where the dataset may contain N different sub-attacks. Each classifier is trained to determine which of the N categories the input belongs in. Although boosting is possible during training, it is not required since it may introduce issues with small datasets that may be available for this use. For each of the classifiers, the intrusion-detecting server 18 is configured to determine a score during testing for each of the sub-attack types. There may be a list of K×N scores denoted by Ski, where k=1, ..., K and j=1, ... N. The process uses the known test scores to decide on which algorithms to use at inference time. An example of a score may be the F1 score, the True Positive Rate (TPR), etc.

At inference time, the process takes a given input and uses all K classifiers to determine the output. Since the available scores indicate how well each of the classifiers can determine the category of the sub-attack, one goal at this stage is to create a prediction that is most likely to be correct or that maximizes the overall score of the classifiers. As an example, there may be multiple ways of determining the sub-attack category, given the output of the K classifiers:

A first way may be to pick the output of the classifier with the best test performance making the prediction. This may include deciding that the sub-attack is j if $S_{kj}$ was the highest score for one or more classifiers.

Another way to determine the sub-attack may be to evaluate a function of the scores for each of the possible outcomes. For example, it is possible to execute some mathematical function (e.g., sum, multiply, etc.) on the stored scores $S_{kj}$ for all classifiers k predicting sub-attack j and choose sub-attack j with the highest overall score.

These two examples demonstrate that the outputs of multiple machine learning strategies can be combined in different ways that can improve the performance of the groups of algorithms over each individual algorithm operating independently.

Conventional systems for using machine learning methods for detecting network attacks do not fully address the problem of detecting of network attacks, because the conventional solutions are made for a single kind of attack and not a more realistic multi-stage attack. Detecting a multi-stage attack can be a challenging problem and has not been explored in these conventional systems due to the lack of appropriate datasets. Implicit in the conventional systems is that each attack is normally detected separately.

Advantageously, the present disclosure provides a single strategy that can detect which stage the attack is in by observing a relatively brief time period, as opposed to typical processes that base a decision on observing a long time-period for a whole multi-stage attack. However, it may be possible that an attacker may take several months or years to execute the whole attack, and therefore one of the advantages for the attacker is that network data is seldomly kept for that long. Therefore, by looking at the available information over a brief period of time, the embodiments of the present disclosure are able to detect each sub-attack individually, using a single processing component with multiple parts for detecting the sub-attacks. That is, the present disclosure includes processes for (a) detecting multi-stage attacks, (b) being able to detect each of the stages with a single method, and (c) using machine learning to detect the sub-attacks.

One process may include detecting a sub-attack stage in a multi-stage network attack (e.g., any sub-attack including two or more of at least reconnaissance, an initial attack, pivoting, lateral movement, and data exfiltration). The process may include network traffic data (or network flow data) and system log data (e.g., server logs, equipment logs, etc.) collected by network equipment (e.g., one or more of the edge elements 14) and delivered to a collection and analysis point (e.g., one or more of the servers 18). At the analysis point (server), the network traffic data is processed and forwarded to a decision point (e.g., at the same or different server 18) to determine the sub-attack type. The decision point returns a category indicating which sub-attack (if any) is detected in the processed network traffic data.

The network traffic information can be collected using NetFlow, sFlow, Internet Protocol Flow Information Export (IPFIX), Packet Capture (PCAP), or the like. The collection point could be a part of a NetFlow/IPFIX infrastructure, hosted on the cloud network 12, in the communications system 10, in a cloud, in a network, or the like. The decision point (server) may be configured to use machine learning to determine the sub-attack type. The decision point can use several machine learning algorithms and combine their outputs to detect the attack type. A machine learning algorithm can be based on Deep Neural Networks (DNNs). Detecting a sub-attack in a multi-stage network attack may include utilizing a combination of machine learning algorithms. Each sub-attack may be detected with a machine learning algorithm trained to detect that specific sub-attack. The sub-attack may be predicted using multiple-trained machine learning algorithms and by selecting the sub-attack corresponding to the machine learning algorithm with the highest possible metric (e.g., F1 score) for that sub-attack. In some embodiments, the machine learning algorithms may include at least one of ensemble algorithms, DNNs, nearest neighbor processes, and clustering processes.

Figure 2:
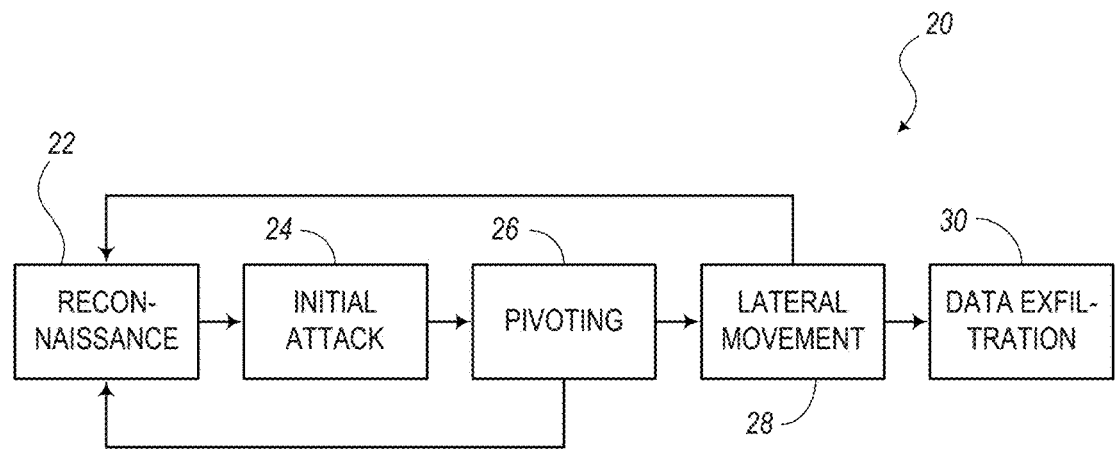
FIG. 2 is a diagram illustrating an attack strategy that can be used by a malicious entity to attack a network.

FIG. 2 is a diagram showing an anatomy of a network intrusion attempt or an attack strategy 20 that a malicious entity might use to attack a network (e.g., communication system 10). In this embodiments, the attack strategy 20 includes multiple stages during which the attacker might probe for vulnerabilities and might get progressively deeper into the networked servers (e.g., servers 18-1, 18-2, . . . , 18-n). For example, the attack strategy 20 of FIG. 2 shows a multi-step attack in which the attacker uses the following sub-attacks: reconnaissance 22, initial attack 24, pivoting 26, lateral movement 28, and data exfiltration 30. Other sub-attacks and sequences may also be possible (e.g., as described in mitre-attack.github.io/attack-navigator/).

Each sub-attack 22, 24, 26, 28, 30 may use its own techniques to accomplish a specific goal. For example, the reconnaissance sub-attack 22 may probe multiple network ports. The initial attack sub-attack 24 may send special packets to breach a server. The pivoting sub-attack 26 may deploy multiple Secure Shell (SSH) sessions to a server to find credentials and information about other servers. The lateral movement sub-attack 28 may include the attacker being able to move from one server to another server to continue the attack further. The data exfiltration sub-attack 30 may be a process by which the attacker transfers data out of the network without being noticed.

It may be noted, first of all, that an attacker may not use all of the sub-attacks 22, 24, 26, 28, 30 in the same sequence as shown in FIG. 2, but may be follow an opportunistic approach to decide how to proceed progressively deeper into the network. It may also be noted that the attacker may not deploy all of the sub-attacks 22, 24, 26, 28, 30 in the same overall attack. Also, it may be noted that the attacker may use different versions of the sub-attacks 22, 24, 26, 28, 30 to hide. It can also be noted that a time frame of an entire multi-stage attack may take weeks, months, or even years. Also, it may be noted that as an attacker proceeds with an attack, he/she may leave behind a "signature" in the network traffic and in certain changes in the attacked servers. This signature may include information that may show that certain events may likely occur close to each other in time. It is therefore possible to use the network traffic information and the system log (or other server information) to classify the sub-attack stage.

There are at least two challenges with detecting this kind of multi-step, prolonged, attack. First, there are multiple possible ways that the attack may evolve over time, and therefore the dimensionality of trying to detect an attack as a path through the sub-attacks of the attack strategy 20 shown in FIG. 2 may be too high to handle by most conventional algorithms. Second, if the attack takes place over a period of months (which is common), then it is likely that the network traffic data over the course of the whole attack will be at least partially discarded. Thus, the embodiments of the present disclosure are configured to detect each of the sub-attacks 22, 24, 26, 28, 30 separately.

Detection of a sub-attack (e.g., any of sub-attacks 22, 24, 26, 28, 30, or others) could be done by detecting the behavior on edges (e.g., edge elements 14) of the network (e.g., cloud network 12). Detecting this behavior may include collecting network traffic information in the cloud network 12. Detecting a sub-attack may also be performed by combining the network traffic (flow) information with the information from one or more nodes (e.g., edge elements 14, servers 18, etc.) of the cloud network 12 to obtain system logs (e.g., server logs). Note that each sub-attack 22, 24, 26, 28, 30 can be considered as a network interaction involving a set of network traffic, followed by changes/actions on a destination server 18. Thus, the entire attack strategy 20 does not need to be considered when detecting each sub-attack 22, 24, 26, 28, 30. Instead, the systems and methods of the present disclosure may be configured to consider each particular stage of the multi-pronged attack by examining network traffic in temporal closeness to server log anomalies.

Figure 3:
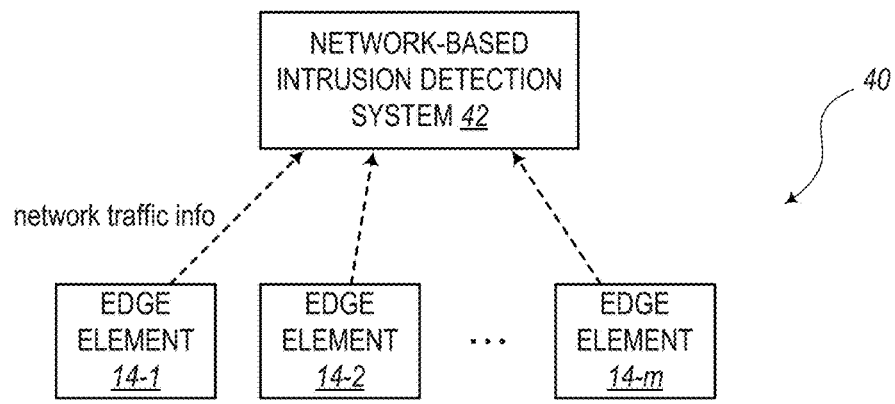
FIG. 3 is a block diagram illustrating a network that utilizes a Network Intrusion Detection System (NIDS) for detecting network attacks, according to some embodiments.
Figure 4:
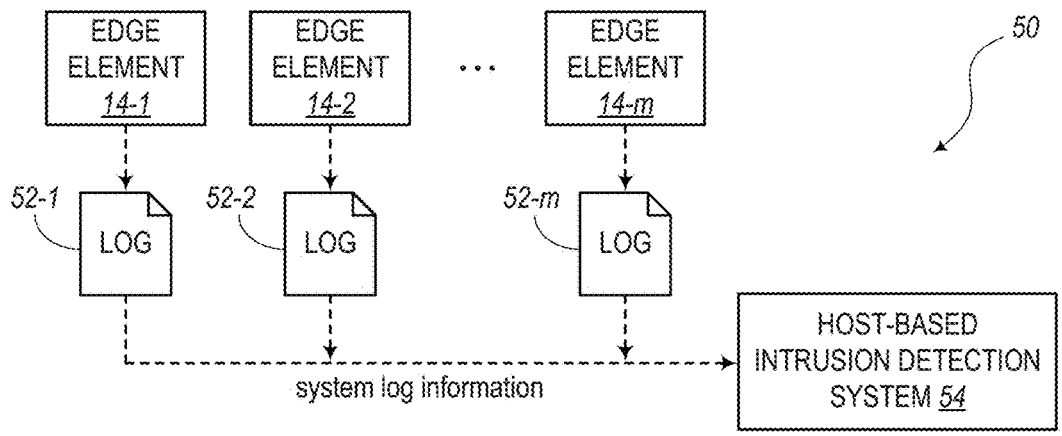
FIG. 4 is a block diagram illustrating a network that utilizes a Host-based Intrusion Detection System (HIDS) for detecting network attacks, according to some embodiments.
Figure 5:
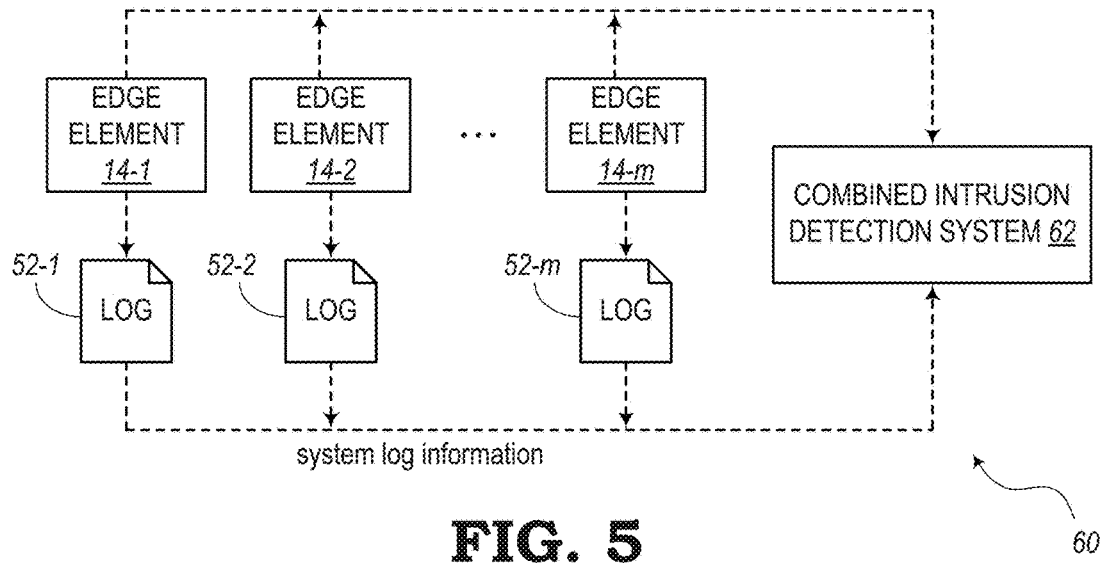
FIG. 5 is a block diagram illustrating a network that utilizes a Combined Intrusion Detection System (CIDS) for detecting network attacks, according to some embodiments of the present disclosure.

FIGS. 3-5 show network systems that can be used to detect attacks. The systems include the multiple edge elements 14-1, 14-2, ..., 14-m shown in FIG. 1. The edge elements 14-1, 14-2, ..., 14-m are configured to collect and classify network traffic and network services and then use this data to train classifiers. Again, the network traffic may be assumed to come from one or more end-point devices (not shown), such as end-point devices 16 shown in FIG. 1, which may be susceptible to an attack. For instance, an attack may start at the edge of the network (i.e., at the edge elements 14 or end-point devices) and the attacker might work to get further into the networked servers.

The network systems of FIGS. 3-5 to include, according to one implementation, the following steps:

1) The edge element collects information about the network traffic and servers in the network. This may include packet counts, flow counts (e.g., IPFIX), information from deep packet inspection, and/or other types of information. Information of the servers may be in the form of system logs.
2) The collected network traffic information and system logs are sent to a centralized point (e.g., an Intrusion Detection System (IDS), a network services device, server, etc.), where this information is used to analyze or train classifiers.
3) After training the classifiers, the IDS (or network services device) disseminates the trained classifiers to the edge elements 14.
4) The edge elements 14 may then use the trained classifier to classify traffic into one of the sub-attack categories of interest.
5) If the traffic is found to include one of the sub-attacks 22, 24, 26, 28, 30 (and/or other) in the categories of an attack (e.g., attack strategy 20), then a predefined policy may be configured to instruct the corresponding edge element 14 how to respond (e.g., re-route traffic, etc.).

FIG. 3 is a block diagram showing an embodiment of a network 40 (e.g., similar to the communication system 10 of FIG. 1) that utilizes a Network Intrusion Detection System (NIDS) 42 for detecting network attacks. The NIDS 42 is configured to obtain network traffic metrics from each of a plurality of edge elements 14-1, 14-2, ..., 14-m. The NIDS 42 can then use the network traffic information to detect attacks and sub-attacks.

FIG. 4 is a block diagram showing an embodiment of a network 50 (e.g., similar to the communication system 10 of FIG. 1). In this network 50, each of the edge elements 14-1, 14-2, ..., 14-m may include an associated database (or other suitable memory) for storing system logs 52-1, 52-2, ..., 52-m obtained with respect to the network 50. The system log 52 may include server log information, equipment log information, edge element log information, or other device log information about the network 50. In this embodiment, the network 50 further includes a Host-based Intrusion Detection System (HIDS) 54 for detecting network attacks. Instead of using traffic information (as is done by the NIDS 42 shown in FIG. 3), the HIDS 54 is configured to use the system logs 52-1, 52-2, ..., 52-m to detect network attacks and sub-attacks.

FIG. 5 is a block diagram showing an embodiment of a network 60 (e.g., similar to the communication system 10 of FIG. 1) that utilizes a Combined Intrusion Detection System (CIDS) 62 for detecting network attacks. The CIDS 62, as the name suggests, is configured to utilize not only the traffic information, but also the system log information. In some embodiments, the CIDS 62 may be considered to be the preferred type of IDS with respect to the various implementations of the present disclosure for detecting and identifying network intrusions.

According to various embodiments, an Intrusion Detection System (IDS) (e.g., FIGS. 3-5) of the present disclosure may include a processing device and a memory device configured to store a computer program. For example, the computer program may have instructions that, when executed, are configured to enable the processing device to obtain network traffic information regarding data traffic in a network under observation and to obtain system log information regarding operations of the network under observation. The instructions also include enabling the processing device to insert the network traffic information and system log information into multiple analysis procedures, whereby each analysis procedure may be configured to detect a respective sub-attack of a multi-stage attack to which the network under observation is susceptible. Then, the processing device, under direction of the computer program, may be configured to combine the outputs of the multiple analysis procedures to detect whether one or more sub-attacks have been launched against the network under observation. In response to detecting that one or more sub-attacks have been launched, the processing device may be configured to determine the type of the one or more sub-attacks.

In some embodiments, each of the multiple analysis procedures may use a machine learning model. For example, each of the machine learning models may include a Deep Neural Network (DNN) technique, an ensemble technique, a nearest neighbor technique, a clustering technique, and/or other techniques. The instructions may further enable the processing device to use a word-embedding procedure when one or more of the network traffic information and system log information is in textual form. For instance, the word-embedding procedure may be configured to change a textual representation of the information into a numerical representation used by the machine learning model. The machine learning model, according to some embodiments, may be configured to predict a sub-attack based on F1 scores.

Also, the IDS of the present disclosure may be implemented whereby the one or more sub-attacks may include, for example, reconnaissance, initial attack, pivoting, lateral movement, and data exfiltration. The one or more sub-attacks may alternatively include reconnaissance, resource development, initial access, execution, persistence, privilege escalation, defense evasion, credential access, discovery, lateral movement, collection, command and control, exfiltration, and impact. The system log information, in some embodiments, may include server logs, router logs, network element logs, equipment logs, device logs, event logs, transaction logs, and/or message logs.

The network traffic information and system log information may be obtained in a "relatively short" time period, such as a time period having a width that is below a predetermined threshold (e.g., less than a few hours, less than a few days, etc.). The network traffic information may be detected using NetFlow, sFlow, IPFIX, and/or PCAP. The step of obtaining the network traffic information and system log information may include receiving the network traffic information and system log information from an edge element (or end-point device) at an edge of the network under observation. This IDS, for example, may be configured as the CIDS shown in FIG. 5 and include the combined features of the NIDS shown in FIG. 3 and the HIDS shown in FIG. 4.

An IDS can therefore be broadly classified into three categories: a NIDS, a HIDS, or a CIDS. In FIG. 3, the NIDS 42 is configured to sniff network packet-generating flows, from which network-based properties are collected and input into machine/deep learning models, whereas the HIDS 54 monitors end device activities such as system logs, network logs, and operating system audit trails. The CIDS 80 is considered to bridge the strengths of NIDS and HIDS. Thus, the CIDS 80 takes its input from a dataset that contains network-based and host-based attributes. Due to the fact that the dataset of the CIDS 80 incorporates data derived from distinct fields (network and host), a novel CIDS model can be created for forecasting intrusions using the combined data.

FIG. 6 is a table illustrating aspects of the systems (e.g., network 40, 50, 60) that utilize a NIDS, HIDS, and CIDS (e.g., NIDS 42, HIDS 54, and CIDS 62, respectively). In some experiments, a Canadian Institute for Cybersecurity (CIC) Intrusion Detection System (IDS) of 2018 (referred to as "CIC-IDS2018") is used as a benchmark with both network flow and host-based (syslog) information. In some cases, a Packet Capture (PCAP) device is used to obtain the network traffic information and system log information, which may be stored in a Comma Separated Value (CSV) format. The CSVs may be part of a tabular dataset that is generated from the PCAP. System event logs may also be obtained, where the system event logs may include host-based information, Windows data, Linux data, etc. The system event logs may need to be parsed and may include a structured data format and/or an unstructured data format.

Figure 7:
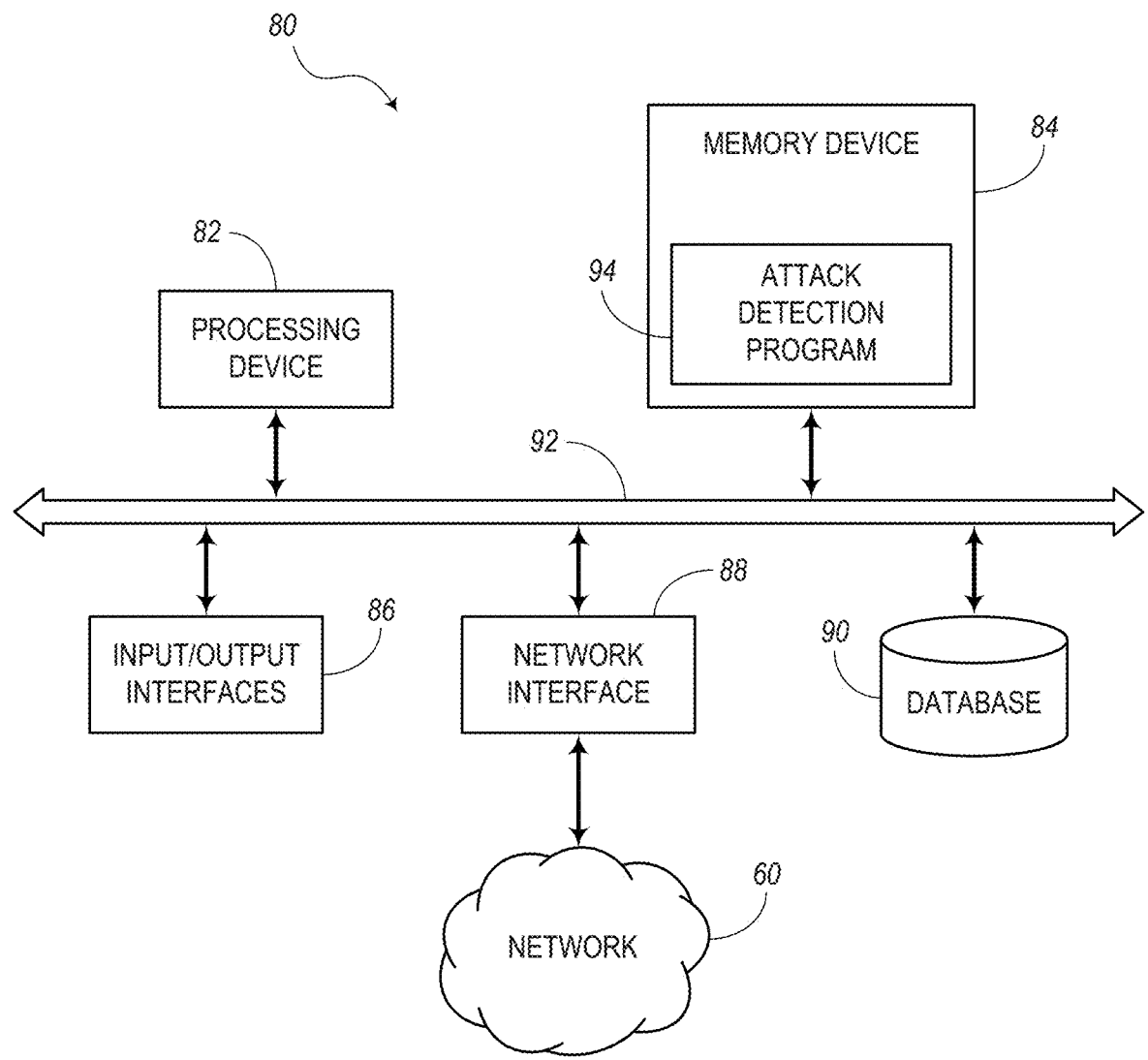
FIG. 7 is a block diagram illustrating a CIDS for detecting network attacks, according to some embodiments of the present disclosure.

FIG. 7 is a block diagram showing an embodiment of a CIDS 80 for detecting network attacks within a network under test or network under observation (e.g., network 10, 40, 50, 60, etc.). In the illustrated embodiment, the CIDS 80 may be a digital computing device that generally includes a processing device 82, a memory device 84, Input/Output (I/O) interfaces 86, a network interface 88, and a database 90. It should be appreciated that FIG. 7 depicts the CIDS 80 in a simplified manner, where some embodiments may include additional components and suitably configured processing logic to support known or conventional operating features. The components (i.e., 82, 84, 86, 88, 90) may be communicatively coupled via a local interface 92. The local interface 92 may include, for example, one or more buses or other wired or wireless connections. The local interface 92 may also include controllers, buffers, caches, drivers, repeaters, receivers, among other elements, to enable communication. Further, the local interface 92 may include address, control, and/or data connections to enable appropriate communications among the components 82, 84, 86, 88, 90.

It should be appreciated that the processing device 82, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 82 may also include or utilize stored program instructions (e.g., stored in hardware, software, and/or firmware) for control of the CIDS 80 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 84 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 84 may incorporate electronic, magnetic, optical, and/or other types of storage media. The memory device 84 may have a distributed architecture, where various components are situated remotely from one another, but can be accessed by the processing device 82.

The memory device 84 may include a data store, database (e.g., database 90), or the like, for storing data. In one example, the data store may be located internal to the CIDS 80 and may include, for example, an internal hard drive connected to the local interface 92 in the CIDS 80. Additionally, in another embodiment, the data store may be located external to the CIDS 80 and may include, for example, an external hard drive connected to the Input/Output (I/O) interfaces 86 (e.g., SCSI or USB connection). In a further embodiment, the data store may be connected to the CIDS 80 through a network and may include, for example, a network attached file server.

Software stored in the memory device 84 may include one or more programs, each of which may include an ordered listing of executable instructions for implementing logical functions. The software in the memory device 84 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 82), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 82 or other suitable circuitry or logic). For example, when executed, the instructions may cause or enable the processing device 82 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 82), or any suitable combination thereof. Software/firmware modules may reside in the memory device 84, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 86 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 86 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 88 may be used to enable the CIDS 80 to communicate over a network, such as the network 10, network 60, the Internet, a Wide Area Network (WAN), a Local Area Network (LAN), and the like. The network interface 88 may include, for example, an Ethernet card or adapter (e.g., 10BaseT, Fast Ethernet, Gigabit Ethernet, 10 GbE) or a Wireless LAN (WLAN) card or adapter (e.g., 802.11 a/b/g/n/ac). The network interface 88 may include address, control, and/or data connections to enable appropriate communications on the network 60.

In some embodiments, the CIDS 80 may include an attack detection program 94, which may be implemented in any suitable form of hardware in the processing device 82 and/or may be implemented in software or firmware and stored in any suitable non-transitory computer-readable medium (e.g., memory device 84, database 90, or the like). The attack detection program 94 may include instructions or other logic commands for causing or enabling the processing device 92 to perform certain functionality to detect network intrusion attempts by a malicious attacker as described in the present disclosure.

Figure 8:
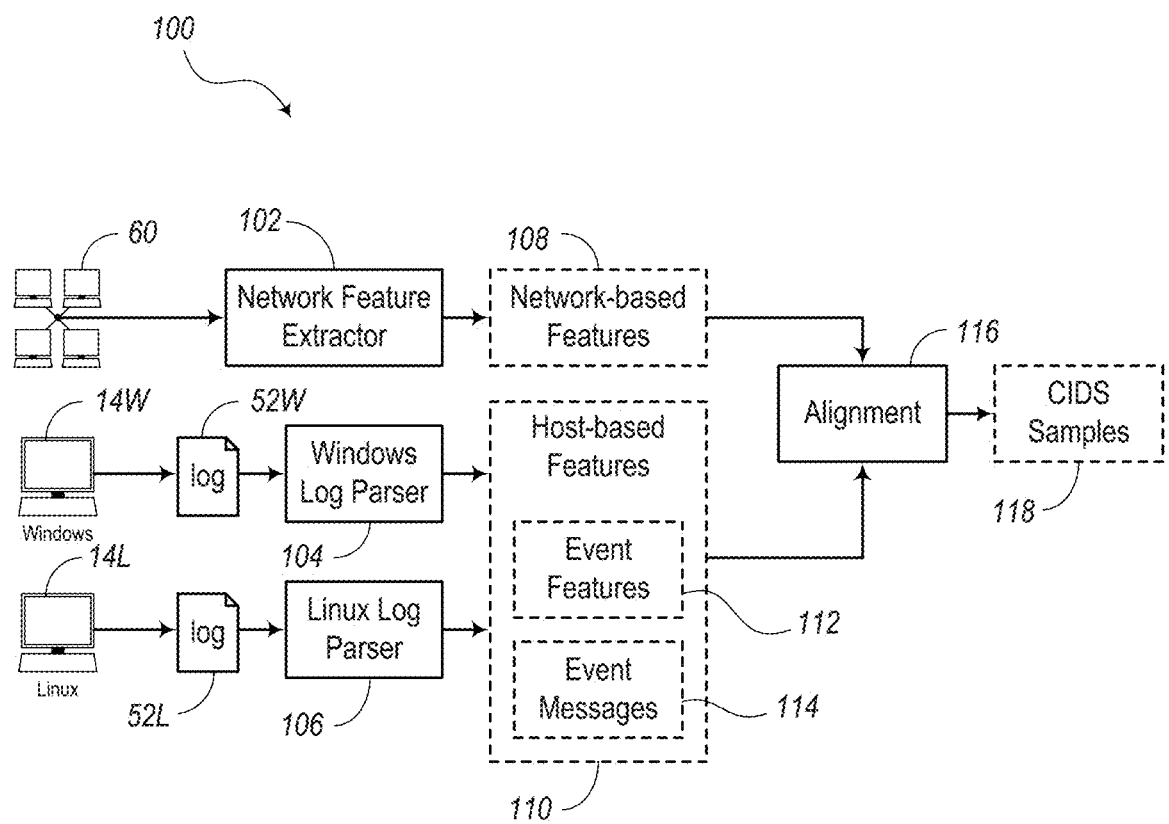
FIG. 8 is a diagram illustrating a data collection unit of the attack detection program shown in FIG. 7, according to some embodiments of the present disclosure.

FIG. 8 is a diagram illustrating an embodiment of a sample generation framework 100 (or data collection unit) of the CIDS 80 of FIG. 7. The sample generation framework 100 is configured to obtain network flow/traffic data from the network 60, which is applied to a network feature extractor 102. The sample generation framework 100 is also configured to obtain log information in the form of system event logs. For example, when the edge elements 14-1, 14-2, . . . , 14-$m$ are designed as Windows elements 14W (as shown in FIG. 8), the Windows elements 14W are adapted to provide system logs 52-1, 52-2, . . . , 52-$m$ in the form of Windows logs 52W. When the edge elements 14-1, 14-2, . . . , 14-$m$ are designed as Linux elements 14L (as shown in FIG. 8), the Linux elements 14L are adapted to provide system logs 52-1, 52-2, . . . , 52-$m$ in the form of Linux logs 52L. The Windows logs 52W are provided to a Windows logs parser 104 and the Linux logs 52L are provided to a Linux log parser 106.

The network feature extractor 102 extracts the features of the network and provides the results to a network-based features buffer 108. The Windows log parser 104 is configured to parse the Window logs 52W and provide the results to a host-based features buffer 110. Also, the Linux log parser 106 is configured to parse the Linux logs 52L and provide the results to the host-based features buffer 110. The host-based features buffer 110 includes an event features buffer 112 and an event messages buffer 114.

The network-based features and host-based features are then provided from the buffers 108 and 110 to an alignment unit 116 configured to align the format of the various features with a uniform format. The alignment unit 116 provides the uniform format of the network-based features and host-based features to a CIDS samples buffer 118, which is configured to pass the information relevant for detecting sub-attacks to the CIDS 80 for processing.

The system event logs may include the CIC-IDS2018 benchmark dataset, which may include two types of computers (i.e., Windows and Linux). The Windows system event logs 52W and Linux system event logs 52L may include a) level, b) time, c) source, d) message, among other features.

A CIDS dataset (e.g., CIC-IDS2018) may be stored in the database 90 shown in FIG. 7. The dataset may include both network-based and host-based features. The attack detection program 94 may be configured to provide a framework for the generation of CIDS instances. A sample generation framework of the CIDS 80 may be configured to extract network-related features from network packets and host-related data from parsed system logs of various operating systems. Due to the fact that host-based and network-based features have separate timestamps and duration characteristics, the sample generation framework 100 may provide an alignment function to generate CIDS samples.

The sample generation framework 100 of the CIDS 80 may use well-established flow-based network feature extractors (e.g., CICFlowMeter, NFStream, and the like). Network-related characteristics are retrieved from network flows, which are a collection of packets that share the same session key (i.e., source IP, source port, destination IP, destination port, protocol, and time window). It may be noted that each network-based sample may be monitored over a period of time rather than a single packet.

Operating systems have different forms of system logs for host-based information. Examples from various operating systems may include, for example:

1) Windows OS system logs: System logs are saved in EVTX format in the Windows operating system, with each entry containing event logging information, warnings, and errors from the OS, services, and applications. System faults or intrusions can be troubleshot by IT experts, and HIDS/CIDS machine/deep learning models are intended to learn valuable features from them. An example of a Windows system log may include event parameters (e.g., severity level, source, and timestamp), as well as an event message explaining the event's contents. The EVTX format can be parsed into a tabular format using (a) NIDS, (b) HIDS, (c) CIDS, or several off-the-shelf system event log parser programs (e.g., Get-WinEvent command let (cmdlet), Log Parser, etc.). Parsed Windows system logs may include both structured and unstructured data in each entry. The attributes extracted by system event log parsers may be directly input into machine/deep learning models, which may be referred to as event features (e.g., ID, version, and provider's name). However, because event messages are in text format and are considered unstructured data, they may be difficult to analyze by a system event log parser.

2) Linux-based OS system logs: Linux-based systems such as Ubuntu or CentOS have text-based system logs with more superficial structures. A Linux system log may include the date and time of each event, the log entry's provider, and event messages. As a result, Linux systems only have one notable event feature, namely, "ProviderName," whereby all other features are NaN. As long as logs can be processed to structured and unstructured data, they can be easily incorporated into this framework.

Each network flow may be monitored within a time window, but each system event may be generated with a precise timestamp. That is, each network-based sample corresponds to multiple host-based samples. As a result, an algorithm may be used to align network-based and host-based instances in the sample generation framework 100 so that they are generated in the same time frame. In some embodiments, the sample generation framework 100 may be configured to seek the host-based samples that have the same IP address and are inside the time window of the network-based instance for each network-based sample. The event characteristics and event messages of the host-based samples are then concatenated, accordingly. Each event feature instance is a vector, and the output of event feature concatenation is a matrix. Event messages are connected together directly to make a longer string. Finally, each combined sample can be considered as a tuple that includes a network-based sample, events features, and events messages. Please note that the terms "events features" and "events messages" are used to highlight the fact that events can take many forms and may be distinguishable in this way.

Figure 9:
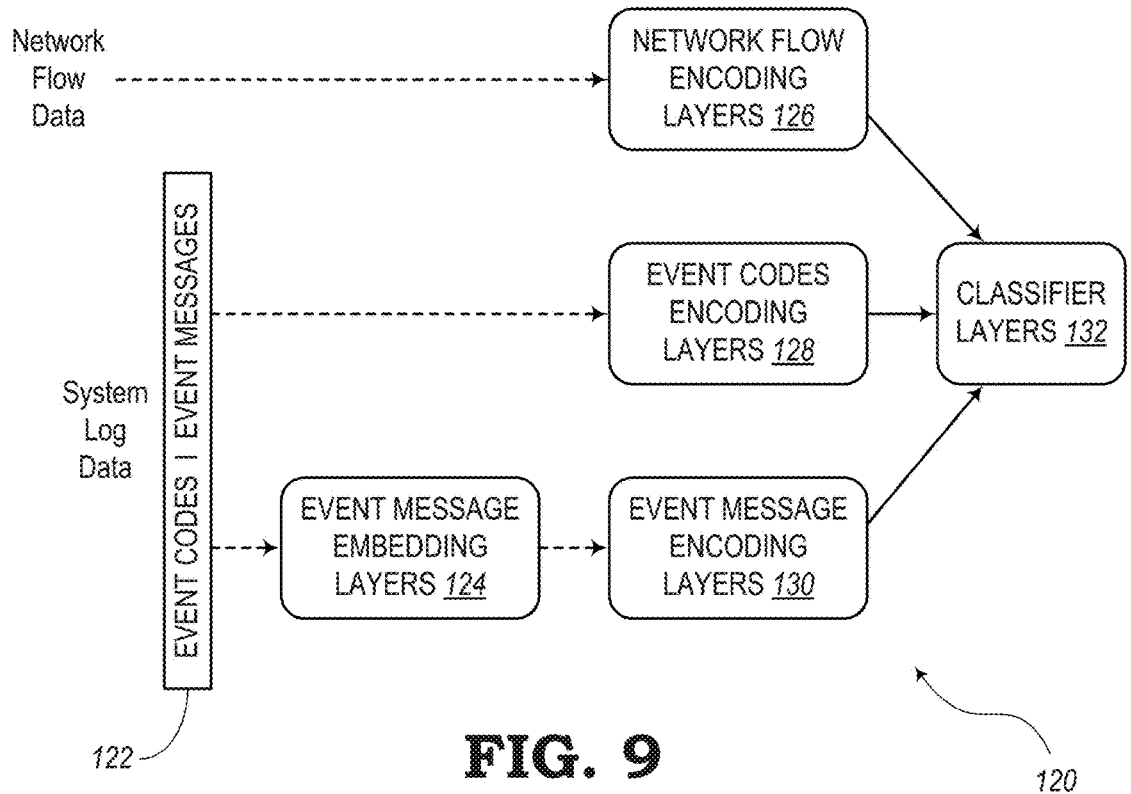
FIG. 9 is a diagram illustrating an attack classifier of the attack detection program shown in FIG. 7, according to some embodiments of the present disclosure.

FIG. 9 is a diagram illustrating an embodiment of an attack classifier 120, which, according to some implementations, may be part of the attack detection program 94 shown in FIG. 7. The attack classifier 120 shows a first example of a multiple input architecture for receiving different forms of data and detecting multi-stage attacks on a network under observation. The attack classifier 120 shows how a machine learning approach can be used for detecting network intrusions.

In this embodiment, the attack classifier 120 receives network flow data (or network traffic information) and system log data. The system log data is applied to a buffer 122 for event codes and corresponding event messages. Event messages are directed to events message embedding layers 124. Network flow data is applied to network flow encoding layers 126. The event codes from the buffer 122 are applied to event codes encoding layers 128. Also, the events messages from the events message embedding layers 124 are applied to event message encoding layers 130. The outputs of the layers 126, 128, 130 are applied to classifier layers 132, which may be configured to classify the sub-attacks.

To incorporate multiple data sources with different structures/formats into a classifier, the attack classifier 120 is configured to transform data into a unified structure. For example, network flow has tabular data, but system logs may have unstructured sources of data. The data may include messages describing events in addition to event codes, which may contain some events-encoded details (e.g., level, task ID, timestamp, etc.). The network input layers (e.g., network flow encoding layers 126) may be configured to make the data uniform. Also, the layers 128, 130 are configured to make the data uniform. The layers 126, 128, 130 may use fully-connected layers, convolutional layers, and/or other types of DNN layers, as would be understood by someone with expertise in the art of DNNs. The messages may be loose text, which may require an extra layer for embedding text into the DNN inputs ("message embedding layers"). Someone with expertise in DNNs would understand that this layer can be implemented using a pretrained DNN model (e.g., Bidirectional Encoder Representations from Transformers (BERT), or the like) to perform a word-embedding procedure to extract information from the messages and transform them into tabular format. In other implementations, the procedures may include other applicable embedding steps. Then, the network flow and transformed system logs datasets are combined and sent to a classifier in the classifier layers 132. For example, this may include DNN, XGBoost, or the like. Also, the classifier layers 132 may be a DNN version that can be implemented in any number of ways (e.g., using fully connected layers, attention layers, etc.). Extra information from a system log, specifically the messages, can be used to improve the attack classification performance, regardless of the classifier.

Figure 10:
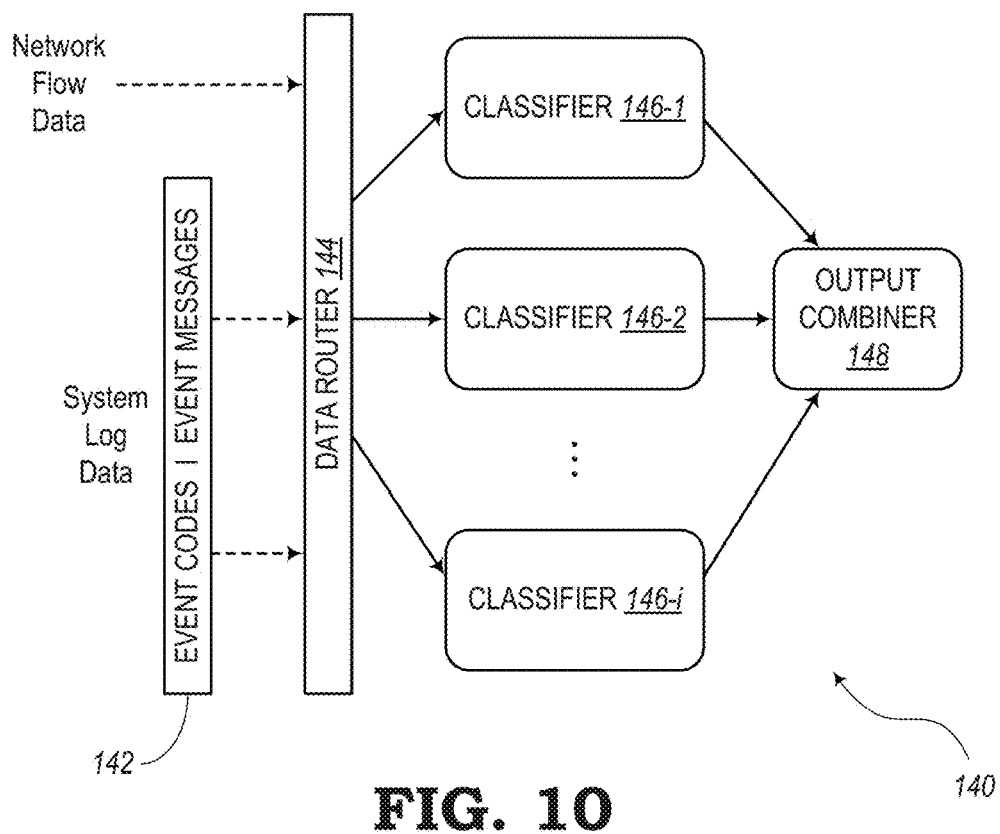
FIG. 10 is a diagram illustrating another attack classifier of the attack detection program shown in FIG. 7, according to some embodiments of the present disclosure.

FIG. 10 is a diagram illustrating another embodiment of an attack classifier 140, which also may be part of the attack detection program 94 shown in FIG. 7. The attack classifier 140 shows a second example of a multiple input architecture for receiving different forms of data and detecting multi-stage attacks on a network under observation. The attack classifier 140 also shows how a machine learning approach can be used for detecting network intrusions.

In this embodiment, the attack classifier 140 receives network flow data (or network traffic information) and system log data. The system log data is applied to a buffer 142 for event codes and corresponding event messages. These event messages and correspond event messages are both transmitted to a data router 144, which is also configured to receive the network flow data. The data router 144 is configured to analyze the type of data and direct the data, as appropriate to different classifiers 146-1, 146-2, . . . , 146-i. The classifiers 146 are configured to classify the data to determine a type of network intrusion or sub-attack and provide the results to an output combiner 148, which is configured to combine the outputs. In this way, the results of each of the classifiers 146 can be used in a single element to determine multiple types of sub-attacks.

Figure 11:
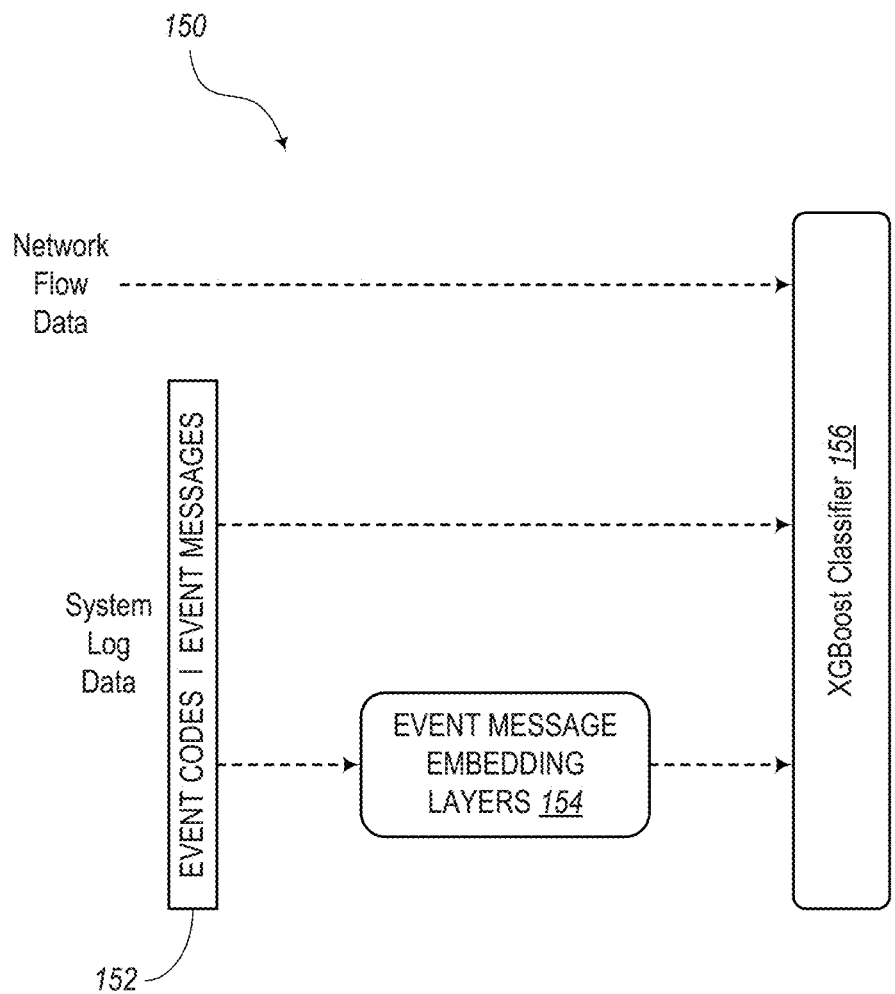
FIG. 11 is a diagram illustrating yet another attack classifier of the attack detection program shown in FIG. 7, according to some embodiments of the present disclosure.

FIG. 11 is a diagram illustrating another embodiment of an attack classifier 150, which may also be part of the attack detection program 94 shown in FIG. 7. The attack classifier 150 of FIG. 11 includes multi-input architecture and may be configured as a low capacity classifier according to some special cases. Compared with the attack classifier 140 of FIG. 10, the attack classifier 150 includes an architecture that may be configured to use, at the outputs, an XGBoost classifier and/or other classifiers (e.g., decision trees, random forests, etc.). As the output classifier has a low capacity compared to a DNN-based classifier, not all inputs are used, and some amount of feature selection may be used during training.

As illustrated, the attack classifier 150 receives network flow data and system log data. The system log data is directed to an event codes buffer 152, which also receives corresponding event messages. From the event codes buffer 152, the corresponding event messages are sent to event message embedding layers 154, while event codes are sent to an XGBoost classifier 156, which also receives the network flow data. A subset of the embedded features of the event message embedding layers 154 is also provided to the XGBoost classifier 156.

The multiple classifier architecture of the attack classifier 150 may be given the same input data and their outputs may be combined to form a common dataset for detecting the type of the one or more sub-attacks. Again, the classifiers can be any type of classifier, such as decision tree, Random Forest, XGBoost, DNN architecture, etc. The attack classifier 150 may be configured to training a dataset to learn how to detect sub-attacks and then use the multiple classifiers to detect intrusions with live data.

In some embodiments, the attack classifiers 120, 140, 150 may be configured to perform a procedure that includes training K classifiers on the same dataset, which contains N different sub-attacks. Each classifier is trained to decide on which of the N categories the input belongs in. Boosting may also be possible during training, in some embodiments, but is not required. Each of the classifiers may be configured to determine a score during testing for each of the sub-attack types. This may include a list of K×N scores denoted by $S_{kj}$, where k=1, . . . , K and j=1, . . . , N. The methods may use known test scores to decide on which algorithms perform preferable prediction results that can be used at inference time. An example of a score may be the F1 score, the True Positive Rate (TPR), etc.

At inference time, the methods may take a given input and use all K classifiers to determine the output. Since the scores are available, indicating how well each of the classifiers can decide what the category of sub-attack is, the goal may be to create a prediction that is most likely to be correct or one that maximizes the overall score of the classifiers.

There may be several ways to decide on an algorithm, given the outputs of the K classifiers, such as:

1. Pick the output of the classifier with the best test performance making the prediction. This may be similar to determining that a sub-attack j is preferred if $S_{kj}$ received the highest score for one or more classifiers.

2. Another way to determine the attack may be to evaluate a function of the scores for each of the possible outcomes. For example, the classifiers 120, 140, 150 may sum the stored scores for all classifiers for predicting sub-attacks and choose the sub-attack with the highest overall score. In other implementations, the classifiers 120, 140, 150 may find a product or use other mathematical expressions for predicting sub-attacks.

These two examples are given as a way of showing that the outputs of multiple machine learning procedures can be combined in many ways. In this way, the overall system can improve the performance of the groups of techniques, procedures, or algorithms over individual algorithms, such as the individual algorithms of the conventional systems.

Figure 12:
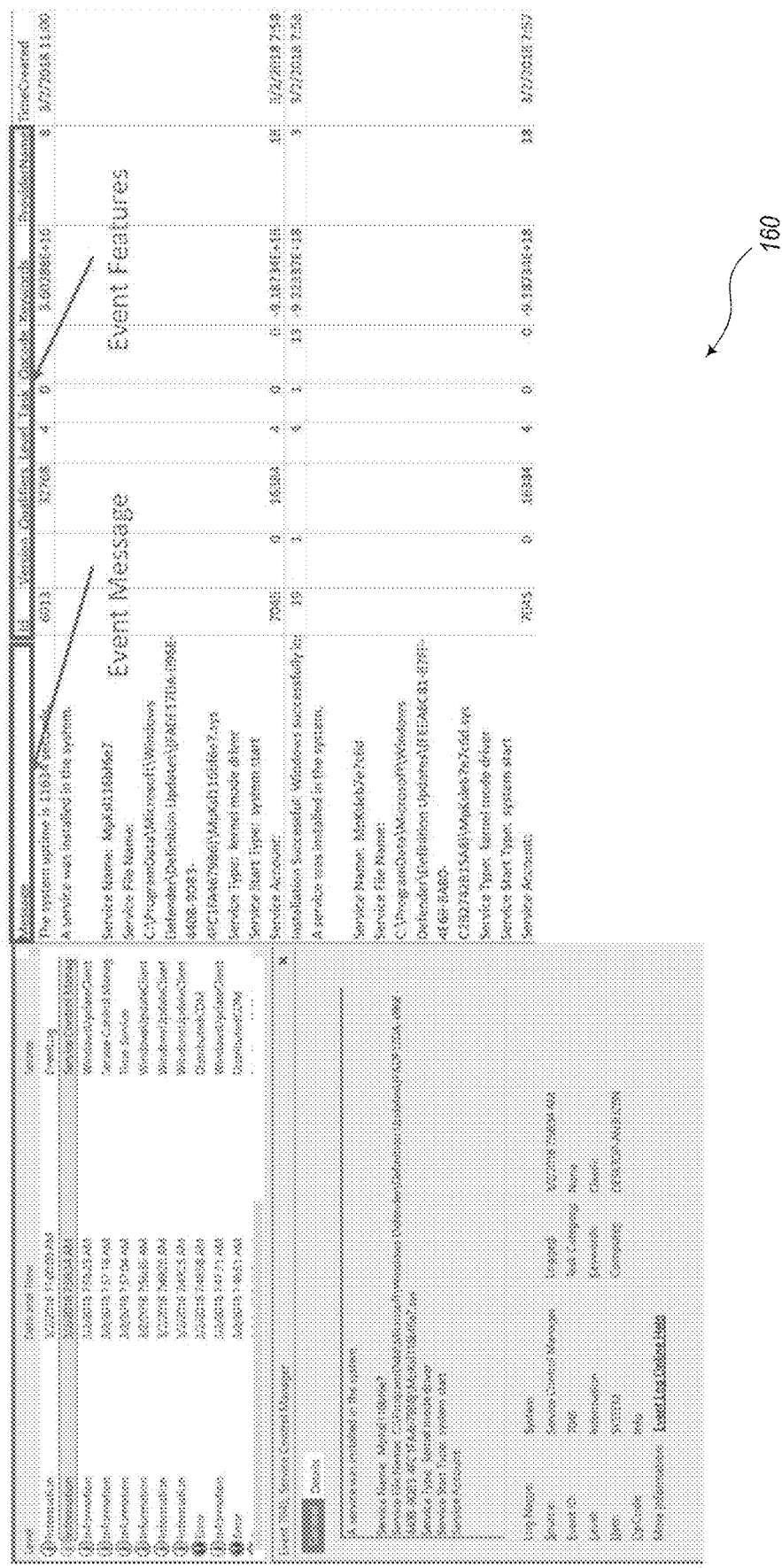
FIG. 12 is a diagram illustrating a screen shot of an event log, according to some embodiments.

FIG. 12 is a diagram illustrating a screen shot 160 of a system event log displayed on a computing device that may be used by a network administer or network operator for viewing network information, system log information, related sub-attacks, and/or predictions of sub-attacks. The screen shot 160 shows parsed system event log information. In some embodiments, the systems and methods of the present disclosure may be configured to align system event log information with network flow or network traffic information. For example, IP data and timestamps may be used for aligning these system events. According to IP addresses, the alignment processes may include searching the host event log. According to the flow's timestamp and a time window (e.g., two minutes for the dataset shown in FIG. 12), the alignment processes may include searching the system log entries.

Figure 13:
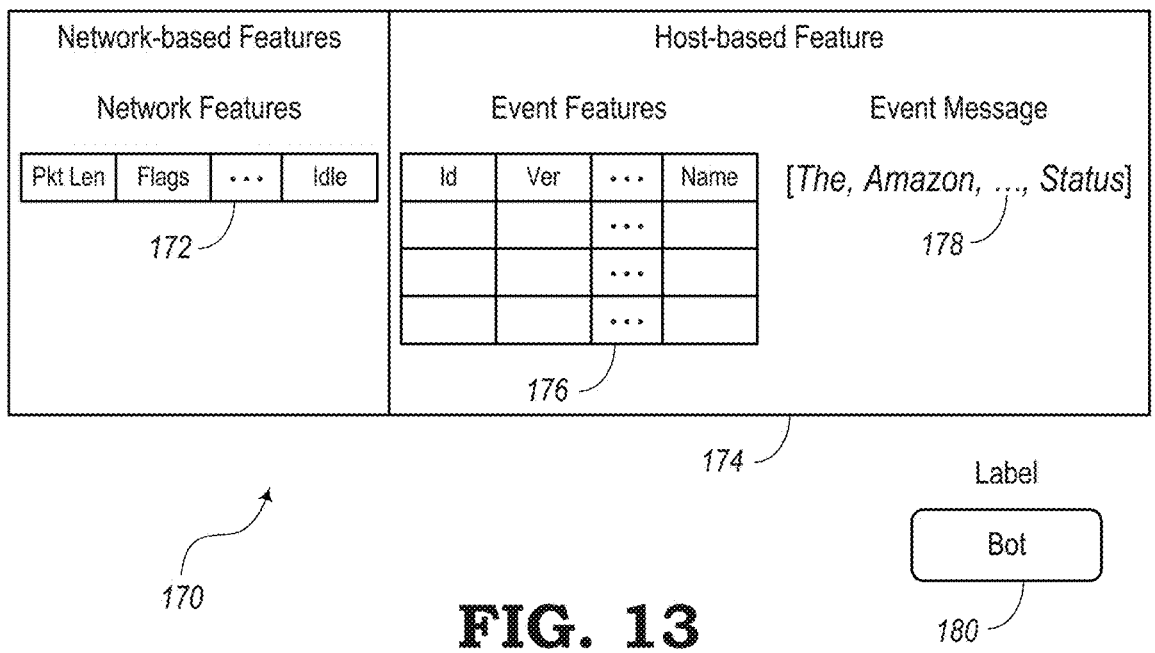
FIG. 13 is a diagram illustrating a dataset including data for use by the attack detection program shown in FIG. 7, according to some embodiments.

FIG. 13 is a diagram showing an example of a dataset 170 that may be used in the systems and methods of the present disclosure. The dataset 170 may include network-based features 172 and host-based features 174. The host-based features 174 may include and event features 176 and an event message 178. The dataset 170 may also include a bot 180.

The dataset 170 may include data for use by the attack detection program 94 shown in FIG. 7 or other systems according to various embodiments. The dataset 170 may be defined as a Combined Intrusion Detection System (CIDS) dataset, where each sample may contain three components: a) the network-based (e.g., traffic, flow, etc.) features 172, which may be 1×132 vector, b) the event features 176, which may be an n×8 matrix, and c) the event message 178, which may include text that can be transformed by a suitable word-embedding element (e.g., BERT or other state of the art word-embedding elements) to an m×768 matrix. For example, about 24% of the samples may have host-based features.

The dataset 170 includes the final structure of a CIDS sample, which may include four components: 1) network-based features, 2) events features, 3) events messages, and 4) a label. The "network features" may be represented in a vector of statistical observations of a flow (e.g., packet length, TCP flags, Inter-Arrival Time, etc.). The "events features" may be represented in a R n×m matrix, where n is the number of event entries within time window, and m is the number of event features. Since "events messages" is a string, Natural Language Processing (NLP) techniques may be utilized.

Figure 14:
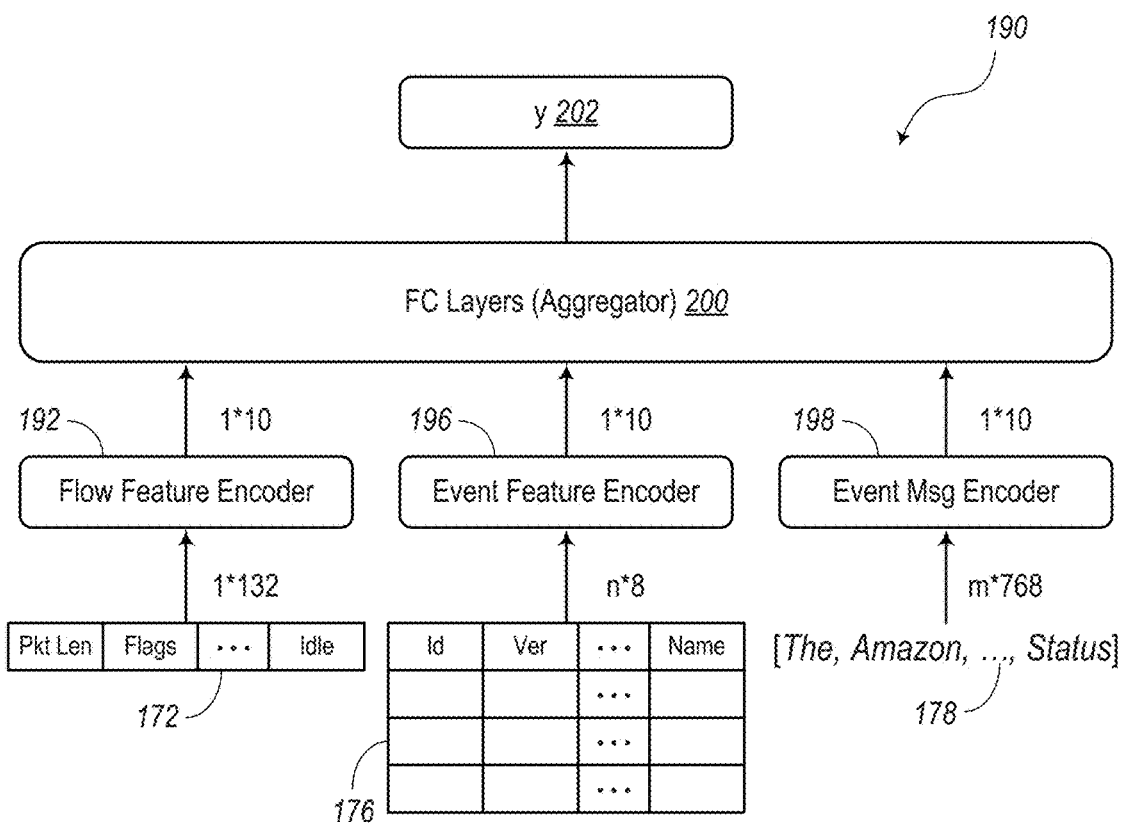
FIG. 14 is a diagram illustrating a model of a CIDS, according to some embodiments.

FIG. 14 is a diagram showing a model 190 of a CIDS, according to one example. In this example, the CIDS model 190 includes three inputs having different dimensions and shapes. As such, the systems of the present disclosure may be configured to: a) encode the different dimension into the same shape, b) concatenate encoded outputs, and c) pass the data to fully connected layers. The model 190 includes the network-based features 172, the event features 176, and the event message 178 as depicted in FIG. 13. Also, the model 190 of FIG. 14 includes a flow feature encoder 192 (which may include fully connected (FC) layers), an event feature encoder 196 (which may include a transformer encoder), and an event message encoder 198 (which may include a transformer encoder). The encoders 192, 196, 198 correspond to the features and messages 172, 176, 178, respectively, and shape each set of values into 1×10 vectors and applies the vectors to fully connected (FC) layers 200. The result of the FC layers 200 are combined in a y function device 202.

Given that the CIDS dataset contains three distinct components (network-based features, event features, and event messages) with varying shapes, dimensions, and types, the embodiments of the CIDS model 190 may be configured to combine these components and predict labels. As shown in FIG. 14, the CIDS model 190 includes three encoders (i.e., Flow Feature Encoder 192, Event Feature Encoder 196, and Event Message Encoder 198), which may be optimized for the three separate inputs. The FC layers 200 may be configured as an aggregator that accepts the encoder outputs as input and generates predictions.

Because network features are essentially tabular data, a Fully Connected Network (FCN) can be used as the flow feature encoder 192 (or network feature encoder), whereas deep learning models in general cannot compete with machine learning approaches such as XGBoost, Decision Tree, and Random Forest, and may require a lengthy tuning process. Thus, to improve network feature representation, alternative deep learning models designed for tabular datasets can also be employed as network feature encoders. In some embodiments, TabNet may be used since it is a highly explainable model with high performance. Specifically, the network feature encoder 192 can also be an Identical Layer, which means that the aggregator 200 takes network features directly as input.

Events Features 176 may be the characteristics of a series of event entities occurring inside the time window of a network flow. Consequently, they can be thought of as multi-variate time series data. The present disclosure may be configured to use the Bidirectional Encoder Representations from Transformers (BERT) encoder as the event feature encoder, which is a state-of-the-art Transformer-based model for time series and NLP. The Event Messages 178, on the other hand, are readable text data that describe the specifics of event entities. The event messages 178 in this model may initially be transformed into vectors using BERT word-embedding. The model 190 may employ a pretrained BERT network in a static manner without fine tuning to avoid overfitting, which may be the result of putting a large network into the CIDS model 190. Additionally, preparation techniques such as Word2Vec, GloVe, or the like can be used as well.

Figures 15, 16:
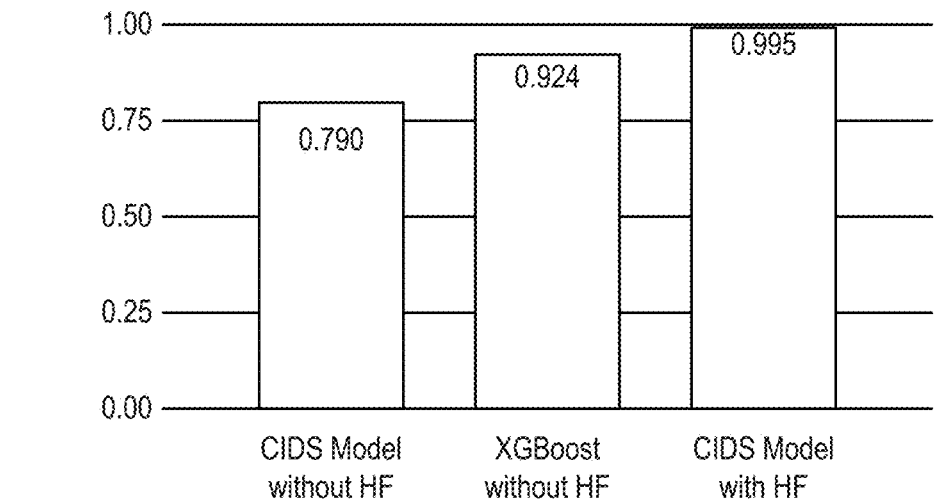
FIG. 15 is a graph comparing the results of the CIDS of FIG. 7 with models without host-based data, according to some embodiments.
FIG. 16 is a table showing the results of CIDS of FIG. 7 compared with other models using different datasets, according to some embodiments.

FIG. 15 is a graph 210 comparing the results of diverse types of intrusion detection techniques. In particular, the graph 210 shows that the CIDS 80 of FIG. 7 outperforms other models that do not use host-based data. To obtain test results in this example, samples having host-based features were considered. It may be noted that the CIDS with host-based features (HF) includes an F1 score of 0.995, while the CIDS model without HF (i.e., only network flow information) includes an F1 score of 0.790. An XGBoost model without HF includes an F1 score of 0.924.

FIG. 16 is a table 220 showing the results of the three models (also compared in FIG. 15) using different datasets. Again, the CIDS model (e.g., using the CIDS 80 of FIG. 7 that utilizes system log data or host-based features (HF)) is compared with other models (i.e., those that do not use system log or HF data).

FIG. 17 is another table 230 showing the results of different models using different datasets. The first two columns show models that do not use system log information and the next two columns show models that do use system log information. It may be noted that the CIDS that use both network flow information and system log information generally outperform their counterpart model for most types of datasets.

Figure 18:
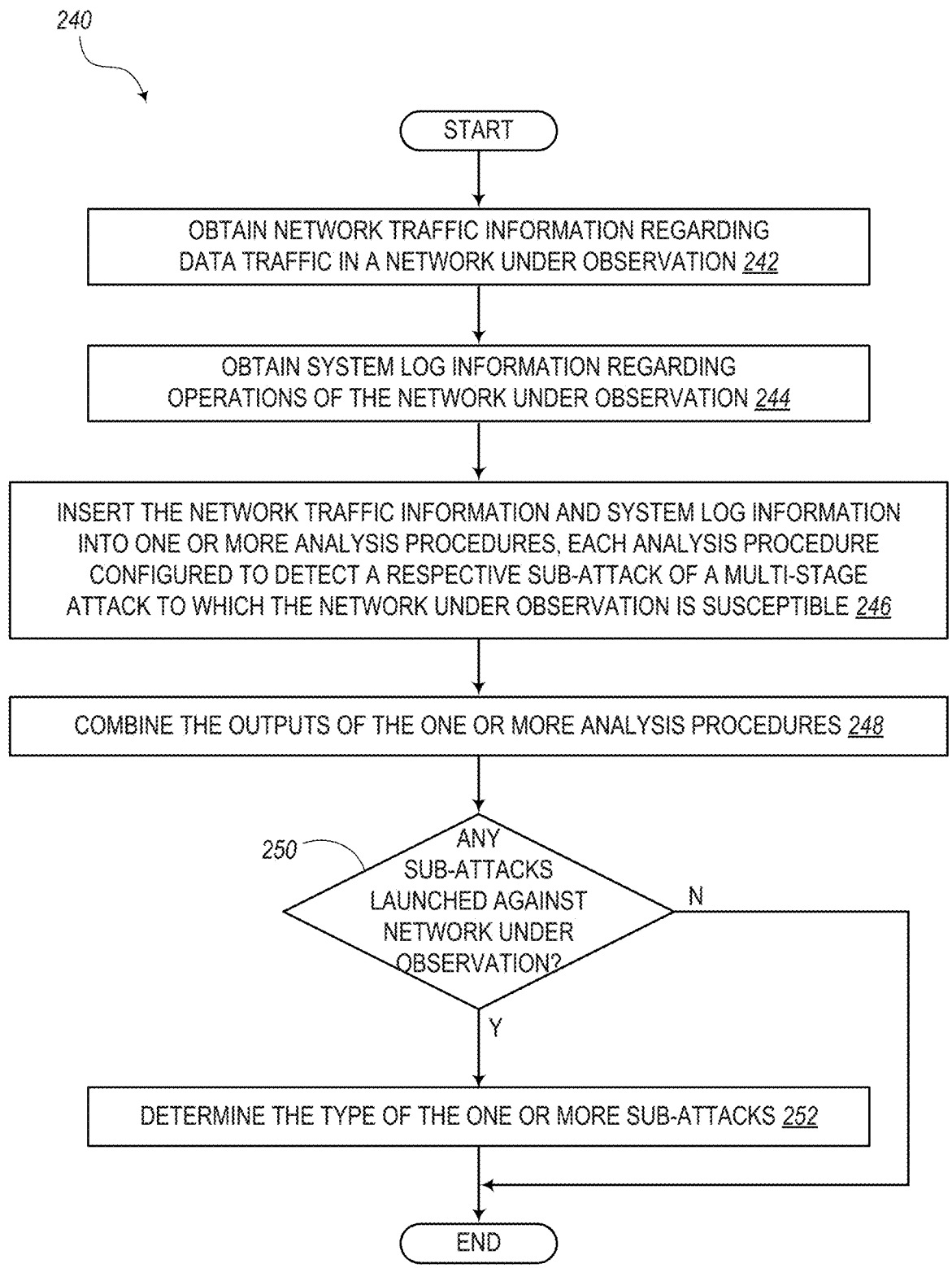
FIG. 18 is a flow diagram illustrating a process for detecting network attacks, according to some embodiments of the present disclosure.

FIG. 18 is a flow diagram illustrating an embodiment of a process 240 for detecting network attacks. In this embodiment, the process 240 includes the steps of obtaining network traffic information regarding data traffic in a network under observation, as indicated in block 242, and also obtaining system log information regarding operations of the network under observation, as indicated in block 244. The process 240 also includes the step of inserting the network traffic information and system log information into one or more analysis procedures, as indicated in block 246, whereby each analysis procedure may be configured to detect a respective sub-attack of a multi-stage attack to which the network under observation is susceptible. Then, the process 240 includes the step of combining the outputs of the one or more analysis procedures, as indicated in block 248 and then determining, according to decision block 250, whether one or more sub-attacks have been launched against the network under observation. In response to determining in decision block 250 that one or more sub-attacks have been launched, the process 240 proceeds to block 252 and determines the type of the one or more sub-attacks.

In some embodiments, each of the one or more analysis procedures (block 246) may use a machine learning model. For example, the machine learning models may include a Deep Neural Network (DNN) technique, an ensemble technique, a nearest neighbor technique, a clustering technique, and/or other techniques. The process 240 may further include using a word-embedding procedure when one or more of the network traffic information and system log information is in textual form. For instance, the word-embedding procedure may be configured to change a textual representation of the information into a numerical representation used by the machine learning model. The machine learning model, according to some embodiments, may be configured to predict a sub-attack based on F1 scores.

Also, the process 240 may be defined whereby the one or more sub-attacks may include, for example, reconnaissance, initial attack, pivoting, lateral movement, and data exfiltration. Furthermore, the one or more sub-attacks may alternatively include reconnaissance, resource development, initial access, execution, persistence, privilege escalation, defense evasion, credential access, discovery, lateral movement, collection, command and control, exfiltration, and impact. The system log information (block 244), in some embodiments, may include server logs, router logs, network element logs, equipment logs, device logs, event logs, transaction logs, and/or message logs.

The network traffic information and system log information may be obtained in blocks 242 and 244 in a "relatively short" time period, such as a time period having a width that is below a predetermined threshold (e.g., less than a few minutes, less than a few hours, less than a few days, etc.). The network traffic information may be detected using NetFlow, sFlow, IPFIX, and/or PCAP. The steps of obtaining the network traffic information (block 242) and system log information (block 244) may include receiving the network traffic information and system log information from an edge element (or end-point device) at an edge of the network under observation. The process 240, according to some embodiments, may be performed by any type of Intrusion Detection System (IDS), such as, for example, a Combined IDS (CIDS) that include features of both a Network IDS (NIDS) and a Host-based IDS (HIDS).

The present disclosure therefore describes many embodiments for detection intrusions or attacks against a network. The embodiments here include many points of novelty with respect to conventional systems. For example, many conventional algorithm deal with the use of machine learning methods applied to network attacks, but the problem of detecting network attacks has only been partially answered, especially since conventional solutions are specifically created for a single kind of attack and are not configured for more realistic multi-stage attacks. However, by handling multiple outputs from multiple sub-attack detection techniques, the present disclosure addresses this shortcoming of the conventional systems.

In addition, the present disclosure described embodiments that do not exist in conventional systems. For example, network traffic as well as systems log information (including messages) can be used together to identify a type of an attack or sub-attack. Detecting such a multi-stage attack has been an overwhelming challenge in conventional systems, but the present implementations are configured to handle the problem of multi-stage attacks. With appropriate datasets, as described herein, the systems and the methods of the present disclosure are configured to create (train) high-performing machine learning models, which can be used to more accurately detect or predict network intrusions.

One advantage of the present disclosure with respect to conventional systems is that the present embodiments are configured to use a "single" method that can detect which stage of the attack is being launched against a network under observation. Also, by obtaining information over a relatively short time-period, as opposed to basing a decision on observing a long time-period for a whole multi-stage attack, the embodiments of the present disclosure are configured to overcome the issue of available network data that may be purged every so often. Since it is possible that an attack may take months or years to execute, one advantage an attacker may have is that this network data is seldomly kept for very long. However, the brief time window of the present disclosure overcomes this issue as well.

Novelty can also be found in (a) detecting multi-stage attacks, (b) being able to detect each of the stages with a single method, (c) combining full system log info with network flow information for network attack classification, and (d) using machine learning strategies to do it. Detecting a multiple-stage attack having the specific types of sub-attacks listed in the present disclosure, using additional information from system logs, and the performing the specific machine learning procedures are believed to be novel.

Detecting Malicious Threats in 5G Network Slices

Some of the above embodiments were conceived before "the edge" was sufficiently defined. Now that fifth-generation (5G) and third-generation Partnership Program (3GPP) Core Networks (CNs) have been defined with better clarity, it may be noted that the edge may end at a User Plane Function (UPF) component. The Internet may be connected to edge devices (e.g., edge elements 14) through an N6 interface. In some embodiments, the virtualized UPF component may reside on a suitable intermediate device (e.g., service delivery switch, carrier system device, etc.). However, it is believed that applying the technology discussed above specifically in a 5G (3GPP) network slice may not be an obvious endeavor. Therefore, the following embodiments provide additional implementations for use in 3GPP (or 5G core) network slices. For example, it may further be understood that UPF components are typically not hosted on these intermediate components between the edge elements 14 and corresponding servers 18 in the cloud network 12.

In addition to the embodiments described above, the following embodiments are also configured to detect malicious attacks within network traffic. More particularly, the embodiments described below are configured for detecting attacks in a 3GPP network slice or 5G core network slice. The embodiments described with respect to FIGS. 1-18 show how network attacks can be detected by means of ML and Deep Neural Network (DNN) approaches. Also, the above embodiments describe systems and methods for detecting network traffic threats using network edge devices (e.g., service delivery switches, Ethernet carrier systems, edge boxes, etc.). The following embodiments are further configured to provide solutions with respect to applications within 3GPP and 5G networks.

Also, previous implementations describe general techniques of identifying malicious traffic and then diverting that traffic elsewhere (e.g., to a "honeypot") for analysis or for simply blocking the flow. Either of those techniques can also be applied to a 5G network slice, as described below.

The systems and methods described herein define traffic monitoring solutions specific to 5G network slices. It may be noted that 3GPP technology typically includes features that are different from regular "network slices" and are defined, for instance, in 5G standards. As described below, the systems are configured to monitor network traffic in each slice independently of other traffic in other slices of the network. It may be noted that 5G network slices are different from pure network slices (e.g., those implemented with VPNs). A 5G (3GPP) network slice may be implemented in a software-based overlay topology where components, which provide services, reside in data centers running on commodity hardware or specialized hardware if needed. On the other hand, the VPNs may be implemented in a network underlay to connect data centers where the overlay resides.

The embodiments of the present disclosure may implement threat detection in the 3GPP network slice overlay. It may be noted that the underlay may not be able to monitor the traffic in the overlay effectively as the overlay traffic is transmitted in 3GPP tunnels, which may be aggregated in underlay VPN tunnels. Also, the overlay tunnels may compress headers or encrypt data or headers.

The User Plane Function (UPF) component in the 3GPP architecture may be configured where a transition between the underlay and overlay traffic occurs in the data plane. In some embodiments, threat detection components may be placed here as well since traffic typically passes through the UPF component. Thus, the traffic may be visible before and after overlay tunneling. The UPF component may have the visibility of traffic in both directions so that it can monitor threats originating on User Equipment (UE) (e.g., end-point devices 16, user devices, end-user devices, etc.) in the slice itself or threats originating from outside of the network slice (e.g., elsewhere on the Internet). For example, the UPF component may be located at a place where it is possible to monitor if an excessive amount of UE traffic is coming from or going to a specific location or country (e.g., traffic to or from Russia).

Figure 19:
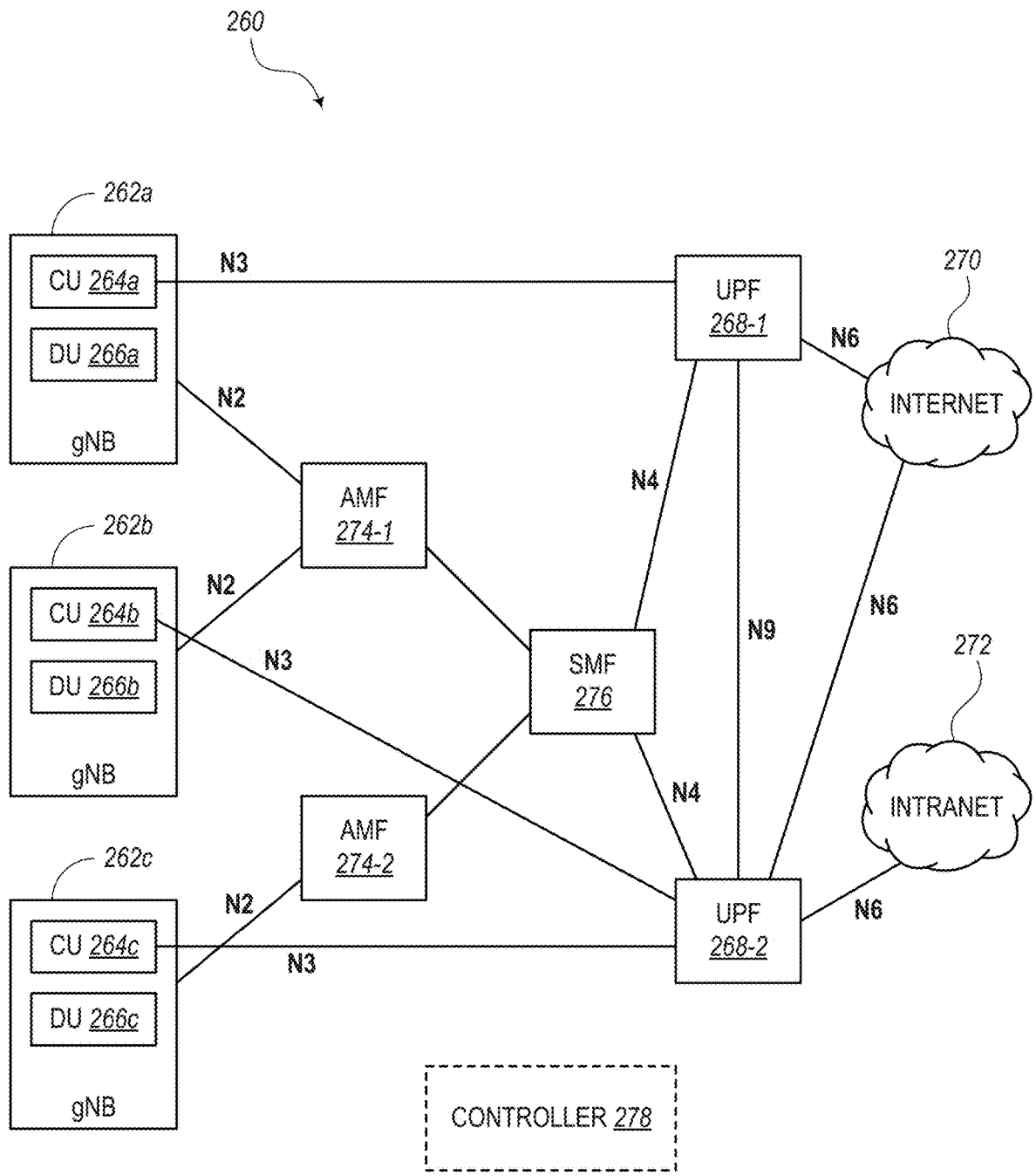
FIG. 19 is a block diagram illustrating an embodiment of a 3GPP network slice 260 to be monitored.

FIG. 19 is a block diagram illustrating an embodiment of a 3GPP (5G) network slice 260 to be monitored. As illustrated in this embodiment, the 3GPP network slice 260 includes gNodeB (gNB) devices 262a, 262b, 262c, which may be configured as edge elements (e.g., edge elements 14), end-user devices, etc. As shown, the gNB devices 262a, 262b, 262c include a Centralized Unit (CU) 264a, 264b, 264c, respectively, and a Distributed Unit (DU) 266a, 266b, 266c, respectively. The CUs 264 of the gNB devices 262 are connected to one or more User Plane Function (UPF) components 268-1, 268-2 via N3 interfaces. For example, the UPF components 268 are arranged in the data plane of the 3GPP network slice 260. The UPF components 268-1, 268-2 are connected to the Internet 270 and/or Intranet 272 via N6 interfaces. Also, the gNB devices 262 are connected to one or more Access and Mobility management Function (AMF) components 274-1, 274-2 via N2 interfaces. The AMF components 274 may be connected to one or more Session Management Function (SMF) components 276. The AMF components 274 and SMF components 276 are arranged in the control plane of the 3GPP network slice 260.

According to some embodiments, a controller 278 may be configured within the 3GPP network slice 260 itself or may be configured external to the 3GPP network slice 260. The controller 278 may be configured to enact control processes for controlling the UPF components 268, AMF components 274, and SMF components 276 for performing procedures for detecting malicious network traffic. For example, the controller 278 may be part of the CIDS 80 or may be part of the attack detection program 94. In some embodiments, the UPF components 268, AMF components 274, and SMF components 276, in combination, may be configured to perform the procedures for detecting malicious traffic, with or without the help of the controller 278.

The controller 278 may be configured to detect malicious traffic in 3GPP (or 5G core) network slices using machine learning. For example, the 3GPP network slice 260 may be defined by the presence of certain 3GPP network functions in the data plane (e.g., the UPF components 268, etc.) and/or in the control plane (e.g., the AMF components 274, the SMF component(s) 276, etc.). The malicious traffic might be generated by an attacker and injected into the 3GPP network slice 260 either through the end-user devices (user equipment (UE), etc.), or from outside of the 3GPP network slice 260 somewhere else on the Internet 270. The attacker might try to damage network infrastructure, steal information through the process of exfiltration, stage an attack to other networks connected to the 3GPP network slice 260 (e.g., Internet 270, Intranet 270, cloud network 12, or other networks). Upon detecting malicious traffic, the controller 278 may use the 3GPP control plane to divert the traffic from the 3GPP network slice 260 into a place where it can be examined or addressed appropriately.

For example, the controller 278 in some embodiments may be implemented in any suitable computer system configured to run software applications for orchestrating devices and traffic flow in a network, which may be used by 3GPP network slice orchestration customers. The procedures of the controller 278 and/or software applications may add value to existing software applications configured to perform network assurance, network analytics, service orchestration, etc. in one or more domains of a network. In addition, as described in more detail below with respect to FIG. 20, the controller 278 and/or software applications described herein may provide access to non-3GPP network elements and may be used with equipment for controlling network traffic through 3GPP network slices.

The 3GPP (or 5G core) network slice 260 may be used to provide a complete 5G network in a specific geographical area. The 3GPP standards generally define the network slice as a set of network functions and their interfaces. For example, the UPF components 268 are configured to perform User Plane Functions (UPFs), which act to bridge network traffic on the Internet 270 into traffic that can be delivered to the 5G end-point devices (e.g., gNB devices 262) by encapsulating the traffic over the N3 interface and sending it to the CU of the gNB devices 262. In some cases, the traffic may come from one or more internal networks (e.g., Intranet 272) since 3GPP makes it easy to create "private" 3GPP networks, such as in the cases of enterprise networks, emergency service networks, etc.

The gNB devices 262 (or end-point devices) may register themselves with the AMF components 274, which are configured to track where users are and coordinate 3GPP services with other 3GPP network functions. For example, the AMF components 274 may interact with the SMF component(s) 276 to ensure that the users receive an appropriate level of service. Also, the SMF component(s) 276 may interact with the UPF components 268 to ensure that the gNB device 262 (or end-point device) is reachable from the Internet 270 even if the user roams with the gNB device 262.

Figure 20:
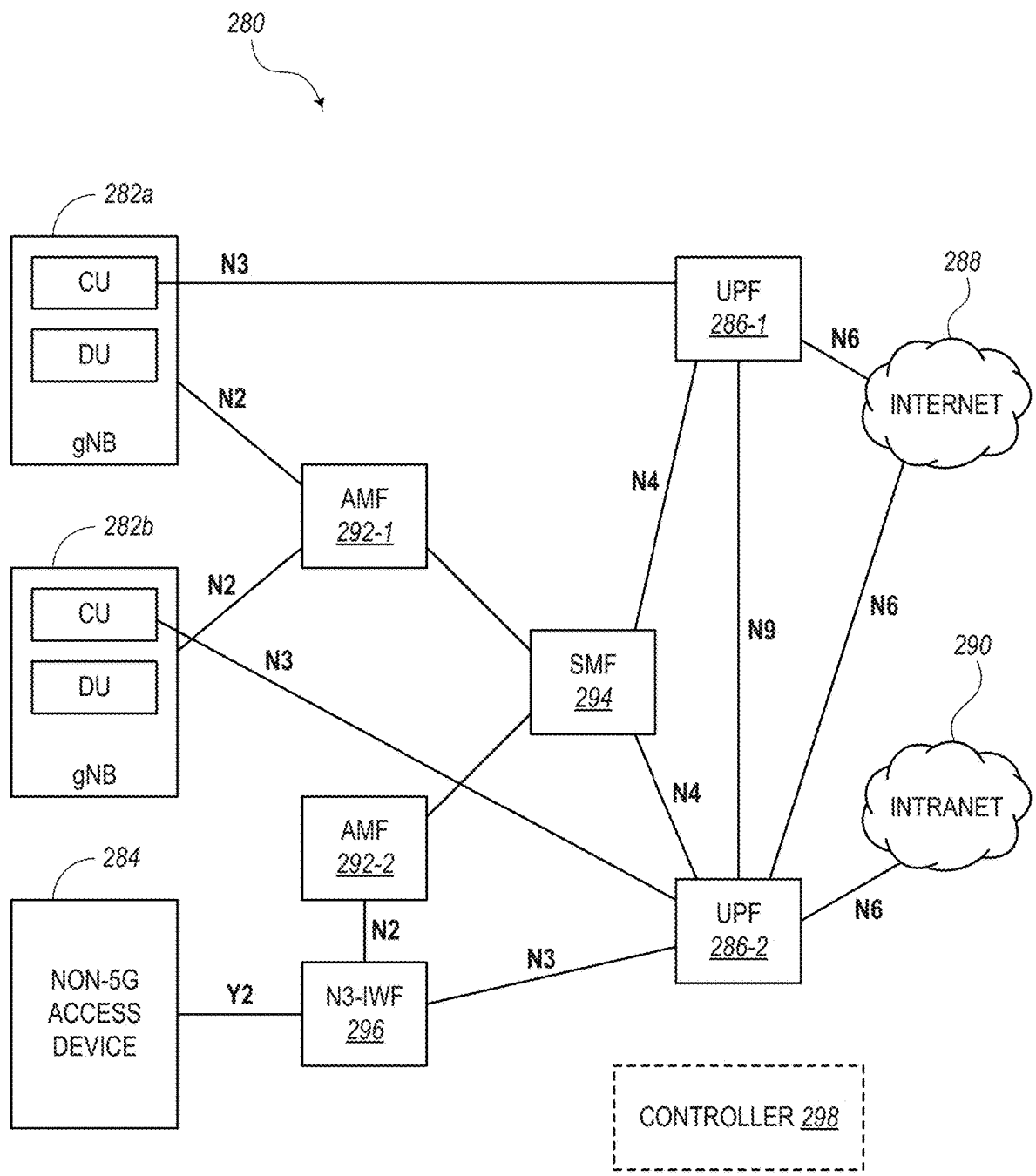
FIG. 20 is a block diagram illustrating another embodiment of a 3GPP network slice 280 to be monitored.

FIG. 20 is a block diagram illustrating another embodiment of a 3GPP (5G) network slice 280 to be monitored. It may be noted that the 3GPP network slice 280 of FIG. 20 includes many similarities to the 3GPP network slice 260 of FIG. 19. In the embodiment of FIG. 20, the 3GPP network slice 280 includes one or more gNB devices 282a, 282b, a non-3GPP device 284, one or more UPF components 286-1, 286-2, the Internet 288, Intranet 290, one or more AMF components 292-1, 292-2, and one or more SMF components 294. Furthermore, the 3GPP network slice 280 may include a Non-3GPP Inter-Networking Function (N3-IWF) device 296. Also, as described above with respect to FIG. 19, the 3GPP network slice 280 may also include a controller 298 for performing the detection of malicious network attacks and/or may at least partially utilize the UPF components 286, AMF components 292, and SMF components 294 to detect attacks.

While 3GPP is generally utilized for wireless communication, the architecture of the 3GPP network slice 280 (e.g., similar to 5G core, 5G New Radio (5G NR), and other core network arrangements) may be configured to support non-3GPP access technologies (e.g., Wi-Fi, Ethernet, DSL, PON, etc.) to allow the non-3GPP device 284 to utilize the 3GPP network slice 280. From the perspective of a network provider, using a common core network allows for uniform access management, policy implementation, and charging across a variety of user devices and may unify and simplify these network functions.

The 3GPP network slice 280 of FIG. 20 may be applicable to certain existing network equipment (e.g., service delivery switches, Ethernet carrier solutions, edge boxes, etc.) and can thereby provide additional benefits with respect to this equipment. In particular, the 3GPP network slice 280 may be configured to provide Internet access for Passive Optical Network (PON) technologies. The 3GPP network slice 280 is configured to offer the non-3GPP device 284 certain N3-IWF functions for the various non-3GPP access technologies. The purpose of the N3-IWF functions is to translate 3GPP network traffic into the traffic used by the non-3GPP device 284 to enable the registration and access of users to the 3GPP network slice 280 or core network domain.

It may be noted that the UPF components 286 may exist in both 3GPP and non-3GPP access scenarios. The user traffic entering the 3GPP network slice 280 traverses the UPF components 286, which is the point where the controller 298 (e.g., associated with a service provider) can monitor user traffic in a uniform fashion across an expanding number of access technologies.

Regarding 3GPP network security, traffic between the gNB device 282 (e.g., Radio Unit (RU), cell site, etc.) and the UPF components 286 (e.g., core) may be controlled by the controller 298 within the service provider domain. For this reason, applying ML solutions to the traffic flow can be an action that only the service provider controls. In this way, the controller 298 may provide an area of differentiation in the delivery of mobile services.

Security issues can take many forms. One area of concern, for example, includes the security of IoT devices. IoT devices may generally include low-cost sensors, monitoring, or control devices that can make use of low-cost silicon and software that might be vulnerable to security flaws. Given the high number of IoT devices currently deployed and to be deployed in the future, it can be difficult and costly to keep these devices updated with the most recent versions of security fixes. For this reason, IoT devices can be vulnerable to low maintenance upgrade standards, limited control of the origin/quality of silicon (i.e., especially in recent times of high demand and supply chain disruptions), and insufficient end-use awareness for proper maintenance and support. As these devices are often used in consumer home applications (e.g., security, utility monitoring, etc.) or transportation solutions (e.g., traffic signaling, connected cars, etc.), any exploitation can therefore have severe consequences. There are also documented cases of IoT devices being used to generate Denial of Service attacks to external applications.

Since the traffic involving IoT devices, 3GPP control devices, and data planes co-exist in the same IP network, it is possible for an attacker to compromise an IoT device (e.g., video camera), use this attack to further attack a UPF component 286, and then use these attacks to further attack the control plane functions (e.g., AMFs, SMFs, etc.) or even attack other 3GPP network slices connected to the attacked 3GPP network slice 280, network segment, Internet 288, or other network, using their own N6 interfaces.

Figure 21:
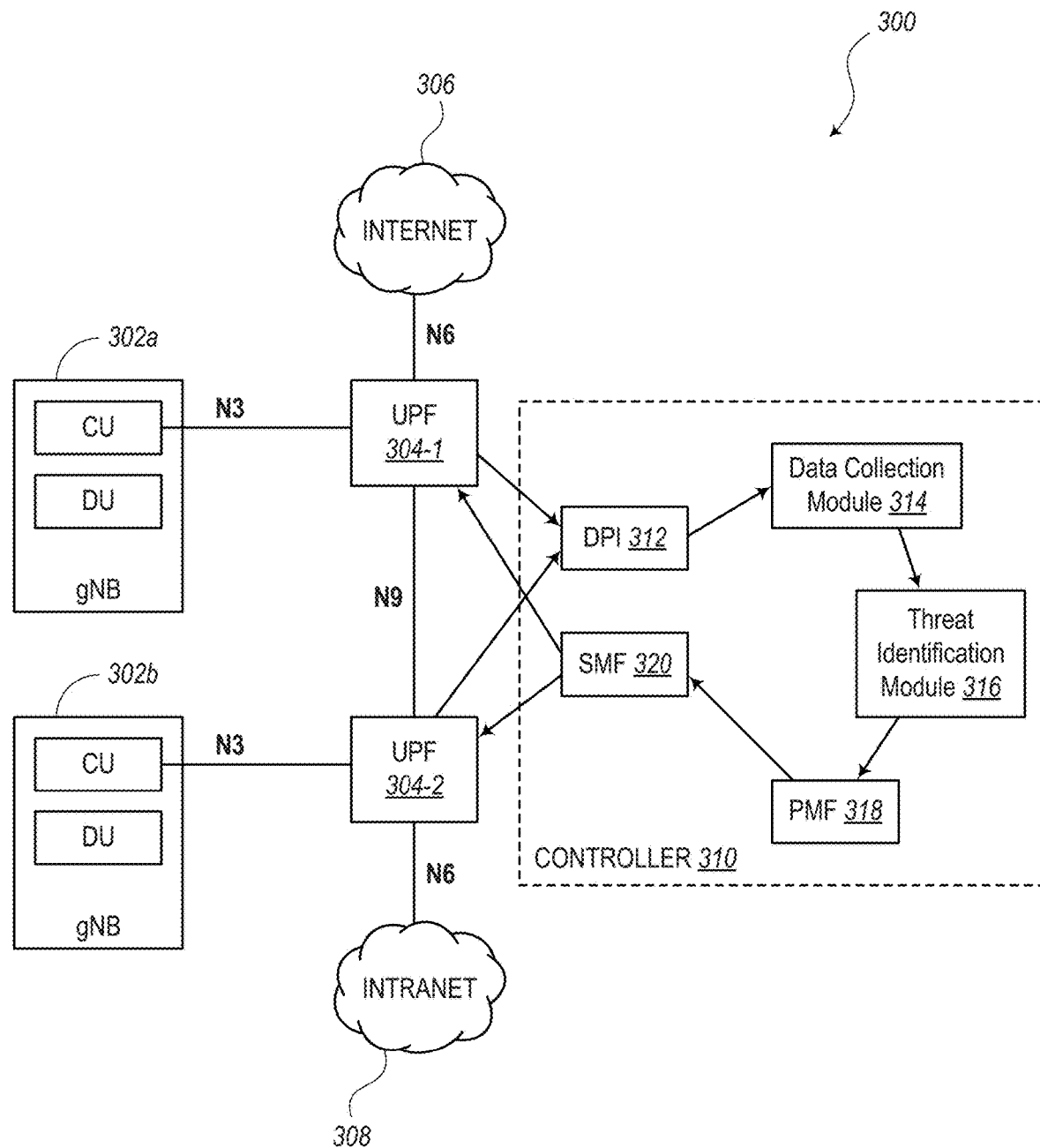
FIG. 21 is a block diagram illustrating a 3GPP network slice 300 being monitored and an embodiment of a traffic monitoring and control device 310 used for monitoring the 3GPP network slice 300.

FIG. 21 is a block diagram illustrating an embodiment of a 3GPP (5G) network slice 300 being monitored (e.g., similar to 3GPP network slices 260, 280). The 3GPP network slice 300 also includes one or more gNB devices 302a, 302b, one or more UPF components 304-1, 304-2, the Internet 306, an Intranet 308, etc. Furthermore, as shown in FIG. 21, the 3GPP network slice 300 includes a controller 310 (e.g., similar to controllers 278, 298). The controller 310 may include a processing device (e.g., processing device 82) and a memory device (e.g., memory device 84). The controller 310 may include an attack detection program (e.g., attack detection program 94) configured with computing logic or instructions to enable the processing device to perform procedures for monitoring network traffic in the 3GPP network slice 300, detect whether the network traffic includes one or more malicious network attacks, and response accordingly. For example, if one or more attacks are detected, the controller 310 may be configured to divert the traffic to a location where the traffic can be further examined and/or to stop the traffic from flowing through the 3GPP network slice 300.

Thus, the controller 310 may be configured to perform traffic monitoring functions and traffic controlling functions. In the illustrated embodiment, the controller 310 may include a Deep Packet Inspection (DPI) module 312, a data collection module 314, a threat identification module 316, a Policy Management Function (PMF) module 318, and a Session Management Function (SMF) module 320. The controller 310 may be configured to monitor the network traffic in the 3GPP network slice 300 and determine if the network traffic includes one or more malicious attacks.

The controller 310 may be configured to enable the processing device to extract network traffic information from the one or more UPF components 304 of the 3GPP network slice 300. The controller 310 may also enable the processing device to examine the extracted network traffic information using Machine Learning (ML). Also, the controller 310 may determine if the extracted network traffic information includes one or more malicious threats. In response to detecting that the extracted network traffic information includes one or more malicious threats, the controller 310 may be configured to isolate the extracted network traffic information to protect at least the 3GPP network slice 300 from the one or more malicious threats.

According to some embodiments, the step of isolating the extracted network traffic information may include diverting network traffic to an isolated location in the 3GPP network slice 300 for further examination. The 3GPP network slice 300, for example, may include one or more Session Management Function (SMF) components 320 and one or more Policy Management Function (PMF) components 318. In some embodiments, the controller 310 may cause the one or more SMF components 320 and one or more PMF components 318 to instruct the one or more UPF components 304 to divert the network traffic to the isolated location when one or more malicious threats are detected. The step of isolating the extracted network traffic information may further include the step of preventing the spread of the one or more malicious threats throughout the 3GPP network slice 300.

The ML mentioned herein may include Deep Packet Inspection (DPI), which may be performed by the DPI module 312. The step of extracting the network traffic information may include extracting 5-tuple Internet Protocol (IP) information, packet capture (PCAP) information, and/or other suitable information. The controller 310 may further be configured to: a) develop a ML model based on a dataset of Performance Metrics (PMs) of observed network traffic information to establish a baseline of expected usage profiles, b) apply the ML model to ongoing network traffic information to identify unexpected network usage that differs from the baseline of the expected usage profiles, and c) utilize the identified unexpected network usage for detecting the one or more malicious threats.

In some embodiments, the one or more UPF components 304 may be arranged in a data plane of the 3GPP network slice 300. Also, the 3GPP network slice 300 may further include one or more Access and mobility Management Function (AMF) components (not shown in FIG. 21) and one or more Session Management Function (SMF) components 320 arranged in a control plane of the 3GPP network slice 300. The one or more UPF components 304 may be arranged between end-user devices and the Internet 306. The end-user devices in some cases may access service/internet via a non-3GPP access device (e.g., non-3GPP device 284 shown in FIG. 20) operating under one or more of Wi-Fi, Ethernet, Digital Subscriber Line (DSL), and Passive Optical Network (PON) protocols. The end user devices may access service/internet via one or more 3GPP devices 302. Each of the 3GPP devices may be one of a gNodeB (gNB) device, and a Radio Unit (RU) and may include at least a Centralized Unit (CU) (e.g., CU device 264 shown in FIG. 19) and a Distributed Unit (DU) (e.g., DU device 266 shown in FIG. 19). The end-user devices may be configured for communicating with the Internet 270, 288, 306 via at least one of the one or more UPF components 268, 286, 304.

By performing the implementation of network slicing to obtain the 3GPP network slice 300, the 3GPP network slice 300 can be monitored. The controller 310 may be configured to isolate different types of traffic and/or different traffic from different customers within the slice. Even if traffic is encrypted, the controller 310 (e.g., operated by a carrier) can analyze the traffic on the 3GPP network slice 300 as discreet data sets with some understanding of the expected behavior of the traffic within the slice. It is a common objective of carriers to define IoT oriented slices where this traffic will be isolated and to offer separate IoT slices to end customers that will further isolate these flows.

The controller 310 may be configured to train a ML model and utilize this ML model for detecting malicious traffic. A ML model can be developed based on a data set made up of the traffic patterns represented by performance metric or other metadata to establish a baseline of the "expected" usage profiles. Then, the ML model can be applied to ongoing network usage information to identify "unexpected" network usage (with respect to the baseline expected usage), even when this traffic usage information is encrypted. These unexpected patterns can then further be identified as out-of-compliance network utilization to help identify network security issues.

The controller 310 may be configured at a pivotal point in the 3GPP network slice 300 for obtaining network traffic at the UPF components 304, particularly since network traffic normally traverses this point, which may also be ideal for lawful intercept capabilities. The DPI module 312 of the controller 310 may be configured to examine network traffic information using Deep Packet Inspection (DPI). The UPF components 304 extract network information (e.g., 5-tupple headers, PCAP data, or other appropriate information) in flows traversing this point. The DPI module 312 is configured to pass this information to the data collection module 314 and threat identification module 316. The threat identification module 316 is configured to determine if the traffic is a network attack. If so, the threat identification module 316 is configured to notify the PMF module 318, which is configured to perform a Policy Control Function (PCF) to instruct the SMF module 320 to subsequently instruct the UPF components 304 to divert or stop the flow as needed. Although the UPF, SMF, and PMF components are standardized by in 3GPP, the DPI module 312, data collection module 314, and threat identification module 316 of the controller 310 are believed to be novel components with respect to 3GPP. In particular, the threat identification module 316 may be similar to the attack classifiers 120, 140, 150 described above with respect to FIGS. 9-11.

Beyond network traffic associated with IoT devices, the systems and methods of the present disclosure, particularly the 3GPP network slices 260, 280, 300, can be applied to other types of network traffic as well, such as enhanced Mobile Broadband (eMBB), Ultra Reliable Low Latency Communication (URLLC), etc. These can also have baseline patterns that can be modeled and analyzed. By applying ML to the sliced network traffic, the embodiments described herein can be differentiated from other existing ML and DPI applications, which may normally focus instead on the N6 interface from the UPF component to the Internet. In contrast, the embodiments of the present disclosure are configured to focus on the traffic at the UPF components themselves and/or the N3 interfaces.

Figure 22:
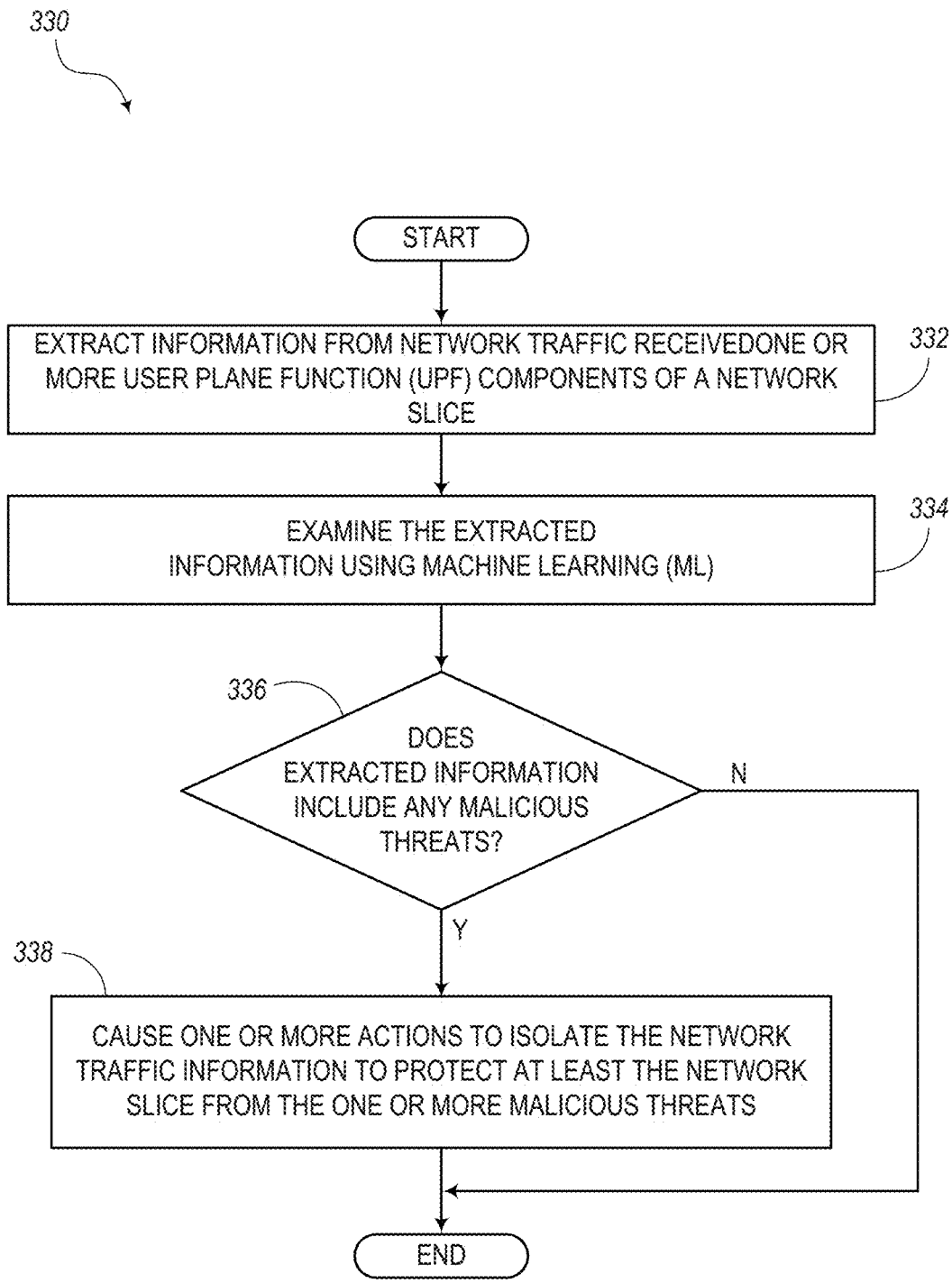
FIG. 22 is a flow diagram illustrating an embodiment of a process 330 for monitoring traffic in a 3GPP network slice.

FIG. 22 is a flow diagram illustrating an embodiment of a process 330 for monitoring traffic in a 3GPP (5G) network slice. In this embodiment, the process 330 includes extracting information from network traffic received from one or more User Plane Function (UPF) components of the network slice, as indicated in block 332. The process 330 also includes examining the extracted information using Machine Learning (ML), as indicated in block 334. The process 330 further includes determining if the extracted information includes one or more malicious threats, as indicated in decision block 336. In response to detecting that the extracted information includes one or more malicious threats in decision block 336, the process 330 include the step of isolating the network traffic to protect at least the 3GPP network slice from the one or more malicious threats, as indicated in block 338. Otherwise, if no malicious threats are detected, the process 330 ends.

According to some embodiments, the step of isolating the network traffic (block 338) may include the step of diverting network traffic to an isolated location in the network slice for further examination. The network slice, for example, may include one or more Session Management Function (SMF) components and one or more Policy Management Function (PMF) components. In some embodiments, the process 330 may include causing the one or more SMF components and one or more PMF components to instruct the one or more UPF components to divert the network traffic to the isolated location when one or more malicious threats are detected. The step of isolating the extracted network traffic information (block 338) may further include the step of preventing the spread of the one or more malicious threats throughout the network slice.

The ML mentioned with respect to block 334 may include Deep Packet Inspection (DPI), which may be performed by a DPI module. The step of extracting the network traffic information (block 332) may include the step of extracting one or more of 5-tuple Internet Protocol (IP) information and packet capture (PCAP) information. The process 330 may further include the steps of: a) developing a ML model based on a dataset of Performance Metrics (PMs) of observed network traffic information to establish a baseline of expected usage profiles, b) applying the ML model to ongoing network traffic information to identify unexpected network usage that differs from the baseline of the expected usage profiles, and c) utilizing the identified unexpected network usage for detecting the one or more malicious threats.

In some embodiments, the one or more UPF components may be arranged in a data plane of the 3GPP network slice. Also, the 3GPP network slice may further include one or more Access and mobility Management Function (AMF) components and one or more Session Management Function (SMF) components arranged in a control plane of the 3GPP network slice. The one or more UPF components may be arranged between one or more end-user devices and the Internet. At least one of the one or more end-user devices in some cases may include a non-3GPP access device operating under one or more of Wi-Fi, Ethernet, Digital Subscriber Line (DSL), and Passive Optical Network (PON) protocols. Each of the one or more end-user devices is one of a gNodeB (gNB) device, a Radio Unit (RU), and a cellular device and may include at least a Centralized Unit (CU) and a Distributed Unit (DU). For example, the CU of each of the one or more end-user devices may be configured for communicating with the Internet via at least one of the one or more UPF components.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, enable a processing device to:
   extract information from network traffic at one or more User Plane Function (UPF) components of a network slice,
   examine the extracted information using Machine Learning (ML) of one or more threat detection components placed at the one or more UPF components where a transition between underlay and overlay traffic occurs in a data plane of the network slice, and
   in response to detection of one or more malicious threats based on the examined extracted information by the ML, cause one or more actions to isolate the network traffic to protect at least the network slice from the one or more malicious threats.

2. The non-transitory computer-readable medium of claim 1, wherein the network traffic is isolated by diverting network traffic to an isolated location in the network slice for further examination.

3. The non-transitory computer-readable medium of claim 2, wherein the network slice includes one or more Session Management Function (SMF) components and one or more Policy Management Function (PMF) components, and wherein the instructions further enable the processing device to
   cause the one or more SMF components and one or more PMF components to instruct the one or more UPF components to divert the network traffic to the isolated location when one or more malicious threats are detected.

4. The non-transitory computer-readable medium of claim 1, wherein the network traffic is isolated by preventing the spread of the one or more malicious threats throughout the network slice.

5. The non-transitory computer-readable medium of claim 1, wherein the ML include Deep Packet Inspection (DPI) performed by a DPI module.

6. The non-transitory computer-readable medium of claim 1, wherein the extracted information includes one or more of 5-tuple Internet Protocol (IP) information and packet capture (PCAP) information.

7. The non-transitory computer-readable medium of claim 1, wherein the instructions further enable the processing device to develop a ML model based on a dataset of Performance Metrics (PMs) of observed information from network traffic to establish a baseline of expected usage profiles.

8. The non-transitory computer-readable medium of claim 1, wherein the instructions further enable the processing device to
   apply the ML model to ongoing network traffic information to identify unexpected network usage that differs from the baseline of the expected usage profiles, and
   utilize the identified unexpected network usage for detecting the one or more malicious threats.

9. The non-transitory computer-readable medium of claim 1, wherein the one or more UPF components are arranged in the data plane of the network slice, and wherein the network slice further includes one or more Access and mobility Management Function (AMF) components and one or more Session Management Function (SMF) components arranged in a control plane of the network slice.

10. The non-transitory computer-readable medium of claim 1, wherein the one or more UPF components are arranged between one or more devices and the Internet.

11. The non-transitory computer-readable medium of claim 10, wherein at least one of the one or more devices includes a non-5G access device operating under one or more of Wi-Fi, Ethernet, Digital Subscriber Line (DSL), and Passive Optical Network (PON) protocols.

12. The non-transitory computer-readable medium of claim 10, wherein each of the one or more end-user devices is one of a gNodeB (gNB) device, and a Radio Unit (RU), wherein each of the one or more devices includes at least a Centralized Unit (CU) and a Distributed Unit (DU).

13. A controller configured to monitor network slice, the controller comprising:
   a processing device, and
   a memory device configured to store computer logic having instructions that enable the processing device to
      extract information from network traffic at one or more User Plane Function (UPF) components of a network slice,
      examine the extracted information using Machine Learning (ML) of one or more threat detection components placed at the one or more UPF components where a transition between underlay and overlay traffic occurs in a data plane of the network slice, and
      in response to detection of one or more malicious threats based on the examined extracted information by the ML, cause one or more actions to isolate the network traffic to protect at least the network slice from the one or more malicious threats.

14. The controller of claim 13, wherein the network traffic is isolated by diverting network traffic to an isolated location in the network slice for further examination.

15. The controller of claim 13, wherein the network traffic is isolated by preventing the spread of the one or more malicious threats throughout the network slice.

16. The controller of claim 13, wherein the instructions further enable the processing device to develop a ML model based on a dataset of Performance Metrics (PMs) of observed information from network traffic to establish a baseline of expected usage profiles.

17. The controller of claim 13, wherein the instructions further enable the processing device to
   apply the ML model to ongoing network traffic information to identify unexpected network usage that differs from the baseline of the expected usage profiles, and
   utilize the identified unexpected network usage for detecting the one or more malicious threats.

18. A method comprising steps of:
extracting information from network traffic at one or more User Plane Function (UPF) components of a network slice;
examining the extracted information using Machine Learning (ML) of one or more threat detection components placed at the one or more UPF components where a transition between underlay and overlay traffic occurs in a data plane of the network slice, and
in response to detecting of one or more malicious threats based on the examined extracted information by the ML, causing one or more actions to isolate the network traffic to protect at least the network slice from the one or more malicious threats.

19. The method of claim 18, wherein the network traffic is isolated by diverting network traffic to an isolated location in the network slice for further examination.

20. The method of claim 18, wherein the network traffic is isolated by preventing the spread of the one or more malicious threats throughout the network slice.

* * * * *